US011465218B2

(12) United States Patent
DeGowske

(10) Patent No.: US 11,465,218 B2
(45) Date of Patent: Oct. 11, 2022

(54) SYSTEM AND METHOD FOR FORMING ALIGNED HOLES IN A WORK PIECE

(71) Applicant: Robert James DeGowske, Three Rivers, MI (US)

(72) Inventor: Robert James DeGowske, Three Rivers, MI (US)

( * ) Notice: Subject to any disclaimer, the term of this patent is extended or adjusted under 35 U.S.C. 154(b) by 94 days.

(21) Appl. No.: 17/035,376

(22) Filed: Sep. 28, 2020

(65) Prior Publication Data
US 2021/0008648 A1 Jan. 14, 2021

Related U.S. Application Data

(63) Continuation-in-part of application No. 16/167,367, filed on Oct. 22, 2018, now Pat. No. 10,807,171.

(51) Int. Cl.
*B23B 47/28* (2006.01)
*B25H 1/00* (2006.01)
*B23Q 9/00* (2006.01)

(52) U.S. Cl.
CPC ............ *B23B 47/28* (2013.01); *B23Q 9/0028* (2013.01); *B25H 1/0078* (2013.01); *B23B 2260/136* (2013.01); *B23B 2270/34* (2013.01)

(58) Field of Classification Search
CPC ... B23B 47/287; B23B 47/28; B23B 2247/04; B23B 2247/00; B23B 2215/04; B23B 2270/34; B23B 2260/136; Y10T 408/5653; Y10T 408/564; Y10T 408/567; Y10T 408/557; Y10T 408/558; Y10S 408/712; B23Q 9/0014; B23Q 9/0028; B25H 1/0021; B25H 1/0078; B25H 1/005; B25H 1/0064
See application file for complete search history.

(56) References Cited

U.S. PATENT DOCUMENTS 2,849,901 A * 9/1958 Kushion .............. B25H 1/0021
408/77
3,557,641 A * 1/1971 Schwandt ................. B27C 3/06
408/91
(Continued)

FOREIGN PATENT DOCUMENTS

DE 3531988 A1 * 3/1987
EP 430228 A2 * 1/1991
WO WO-8810166 A1 * 12/1988

*Primary Examiner* — Chwen-Wei Su
(74) *Attorney, Agent, or Firm* — Larry E. Henneman, Jr.; Henneman & Associates, PLC

(57) ABSTRACT

A novel drill jig includes an edge alignment guide, a hole-spacing assembly, a second guide, a biasing member, and an actuator. The edge alignment guide is configured to abut an edge of a workpiece to facilitate movement of the workpiece along a first straight line. The hole-spacing assembly includes a protrusion disposed to engage a preexisting hole in a workpiece positioned by the edge alignment guide. The second guide is coupled to the hole-spacing assembly and is configured to facilitate movement of the hole-spacing assembly along a second straight line perpendicular to the first straight line. The first biasing member is coupled to the hole-spacing assembly and is operative to exert a force on the hole-spacing assembly in a direction parallel to the second straight line. An actuator moves the hole-spacing assembly along the second straight line via the first biasing member.

20 Claims, 27 Drawing Sheets

(56) References Cited

U.S. PATENT DOCUMENTS 5,062,746 A * 11/1991 Deremo .................. B23B 47/28
408/95
5,217,331 A * 6/1993 Ericksen ............... B23B 39/162
408/112

* cited by examiner

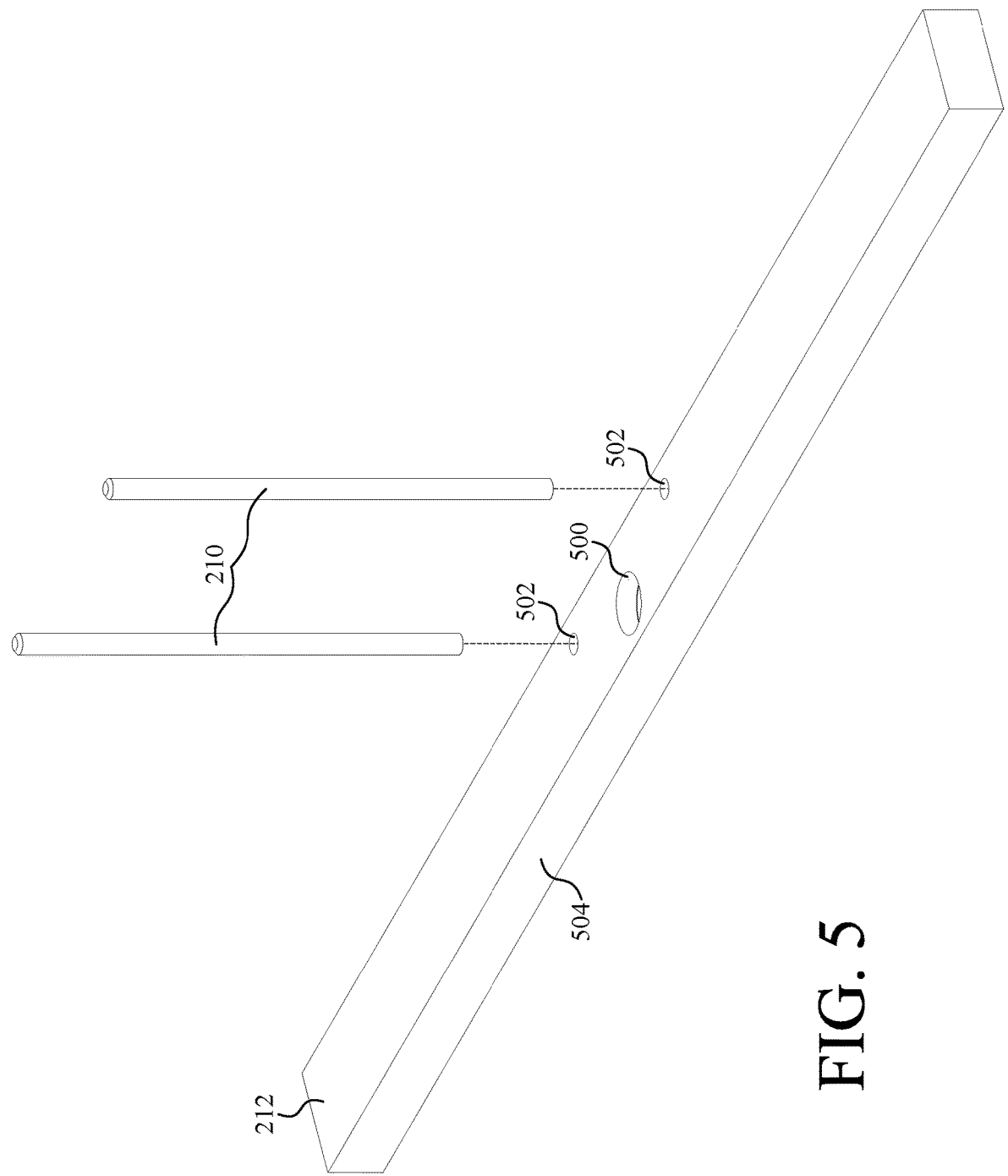

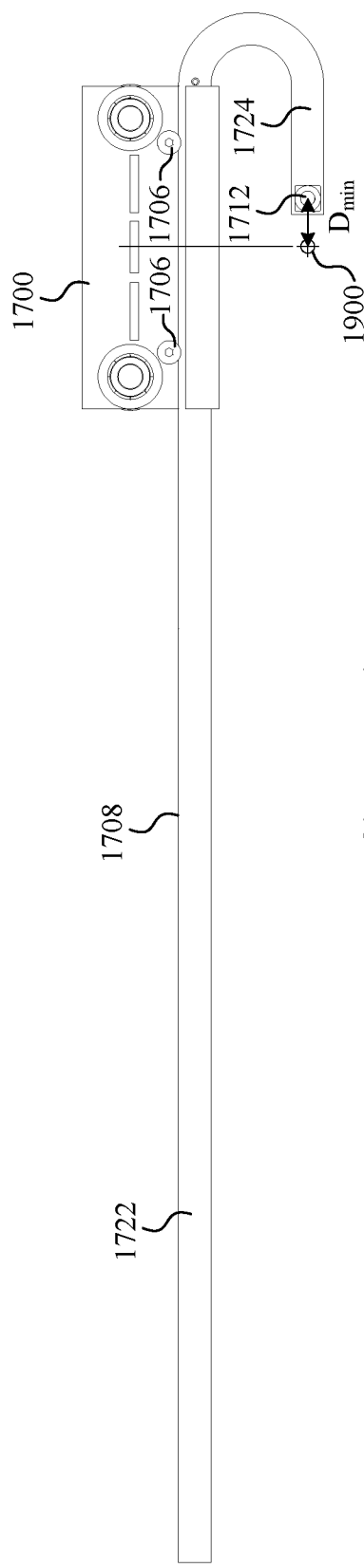
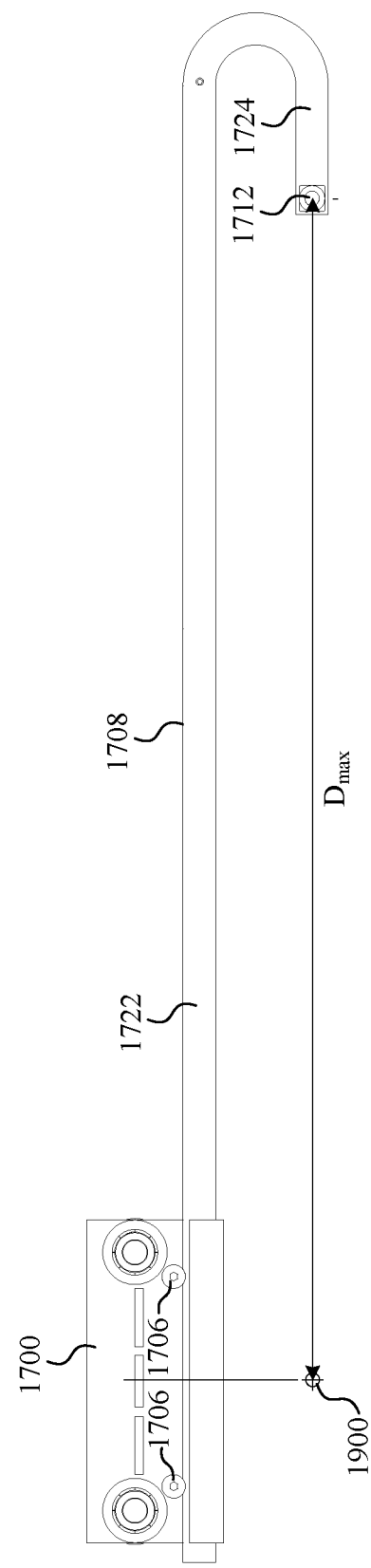
FIG. 19A
FIG. 19B

SYSTEM AND METHOD FOR FORMING ALIGNED HOLES IN A WORK PIECE

CROSS REFERENCE TO RELATED APPLICATIONS

This application is a continuation-in-part of U.S. patent application Ser. No. 16/167,367, filed on Oct. 22, 2018 by the same inventor, which is incorporated by reference herein in its entirety.

BACKGROUND OF THE INVENTION

Field of the Invention

This invention relates generally to drill jigs, and more particularly to a jig facilitating the linear alignment and relative spacing between drill holes.

Description of the Background Art

In construction and manufacturing industry, it is often desirable to drill multiple holes in a workpiece. Oftentimes, the workpiece specifications require holes to be drilled a particular distance from a previously drilled hole. One way this is accomplished is by using a drill stencil, which is essentially a rigid plate having a plurality of holes with fixed spacing therebetween. Before the drilling process, a user positions the stencil on the workpiece by some suitable means (e.g., tape, adhesive, clamp, etc.). With the stencil fixed to the workpiece, the user drills the areas of the workpiece exposed by the holes in the stencil.

There are several challenges inherent to the use of drilling stencils. As one example, such stencils wear out relatively quickly because they are typically made from materials softer than a drill bit, so as not to dull the drill bit. As the drill bit or bit guide contacts the stencil, it gradually wears on the stencil edges defining the holes. After so many uses, the stencil holes become so large and irregularly shaped that they no longer provide sufficient accuracy and/or precision. Of course, when this occurs, the stencil must be replaced. As another example, drill stencils provide for a very low degree of accuracy and precision even when they are new and unworn. This is because the stencil only exposes the part of the workpiece and does facilitate the perpendicular or angled positioning of the drill bit with respect to the workpiece. Consequently, the bore angles of the drill holes in the workpiece are often incorrect when a stencil is used. As yet another example, drilling multiple holes in a workpiece using a stencil is relatively time consuming, because it is difficult to achieve a high degree of accuracy and precision.

What is needed, therefore, is a device for drilling multiple holes in a workpiece that does not wear out. What is also needed is a device for drilling multiple holes in a workpiece with a higher degree of accuracy, precision, and/or consistency. What is also needed is a device for drilling multiple holes in a workpiece in much less time and with much less effort.

SUMMARY

The present invention overcomes the problems associated with the prior art by providing drill jigs for drilling precision spaced holes in a workpiece. Example embodiments of the invention facilitate quick and easy drilling of holes in a work piece, while reducing wear on the jig and providing better ergonomics for the user.

An example drill jig includes an edge alignment guide, a hole spacing assembly, a second guide, a first biasing member, and an actuator. The edge alignment is guide configured to abut an edge of a workpiece, to facilitate movement of the workpiece along a first straight line. The hole-spacing assembly includes a protrusion disposed to engage a preexisting hole in a workpiece positioned by the edge alignment guide. The second guide is coupled to the hole-spacing assembly and is configured to facilitate movement of the hole-spacing assembly along a second straight line perpendicular to the first straight line, whereby the protrusion can be moved into and out of the preexisting hole. The first biasing member is coupled to the hole-spacing assembly and is operative to exert a force on the hole-spacing assembly in a direction parallel to the second straight line. The actuator, responsive to a force applied by a component of a drill, is operative to move the hole-spacing assembly along the second straight line via the first biasing member.

A particular example embodiment additionally includes a base and a second biasing member. The base configured to be mounted on a drill press table, and the second guide is coupled to the base. The second biasing member is disposed between the hole-spacing assembly and the base. The stiffness of the first biasing member is greater than the stiffness of the second biasing member, so the second biasing member compresses before the first biasing member when the actuator is urged toward the base. The second guide can include a set (1 or more) of parallel rods fixed to the base, and the hole-spacing assembly is slidably coupled to the set of parallel rods.

In a particular example embodiment, the hole-spacing assembly includes a rigid body, and a position of the protrusion with respect to the rigid body is adjustable. For example, the rigid body can define a plurality of linearly aligned apertures, each aperture configured to selectively seat the protrusion. As another example, the rigid body can define a linear slot configured to adjustably seat the protrusion. In addition, the distance between the edge alignment guide and the protrusion can be adjustable.

The rigid body of the hole-spacing assembly defines an aperture through which a drill bit can pass when the first biasing member is compressed. The aperture also facilitates the alignment of the rigid body with respect to the drill bit during the mounting of the base to a drill press table. Optionally, the aperture can be replaced with a notch or channel to facilitate the passage of the drill bit and alignment of the base with respect to the drill press table.

The rigid body of the hole-spacing assembly can transparent. The rigid body can also include indicia (e.g., rule markings, measuring scale, etc.) configured to identify the position of the alignment protrusion with respect to the rigid body. As another option, the protrusion can define a tapered end configured to engage a drill hole. The tapered end can be smooth to prevent any damage to the drill hole.

In another example drill jig, the hole-spacing assembly includes a rigid body, and the edge alignment guide is an integral feature defined by the rigid body. A position of the protrusion with respect to the rigid body can be adjustable, and the rigid body can be transparent.

Another example drill jig includes a rigid body and a protrusion coupled to the rigid body. The rigid body includes an edge alignment guide and a drill attachment feature. The edge alignment guide is configured to abut an edge of a workpiece to facilitate movement of the rigid body along a straight line parallel to the edge of the workpiece. The drill attachment feature is configured to facilitate the mounting of the rigid body to a drill component. A protrusion is coupled to the rigid body and is configured to engage a preexisting hole in a workpiece positioned by the edge alignment guide. The protrusion can be adjustably coupled to the rigid body, whereby a position of the protrusion with respect to the rigid body can be changed. Optionally, the rigid body can be transparent.

Methods for manufacturing a drill jig are also disclosed. One example method includes providing an edge alignment guide configured to abut an edge of a workpiece to facilitate movement of the workpiece along a first straight line. The example method additionally includes providing a hole-spacing assembly including a protrusion disposed to engage a preexisting hole in a workpiece positioned by the edge alignment guide, and providing a second guide configured to facilitate movement of the hole-spacing assembly along a second straight line perpendicular to the first straight line. The method additionally includes coupling the second guide to the hole-spacing assembly, providing a biasing member, and coupling the biasing member to the hole-spacing assembly, so that the biasing member is operative to exert a force on the hole-spacing assembly in a direction parallel to the second straight line. The method additionally includes providing an actuator and coupling the actuator to the biasing member so that, responsive to a force applied by a component of a drill, the actuator is operative to move the hole-spacing assembly along the second straight line via the biasing member.

BRIEF DESCRIPTION OF THE DRAWINGS

The present invention is described with reference to the following drawings, wherein like reference numbers denote substantially similar elements:

FIG. 5 is an exploded perspective view of a base and guides of the drill jig of FIG. 1;

FIG. 19A is a top view of the hole-spacing assembly of FIG. 17 in a first configuration;

FIG. 19B is a top view of the hole-spacing assembly of FIG. 17 in a second configuration;

DETAILED DESCRIPTION

The present invention overcomes the problems associated with the prior art, by providing drill jig capable of drilling linearly aligned and evenly spaced holes in a workpiece (e.g., the side board(s) of cabinetry, book shelves, etc.). In the following description, numerous specific details are set forth (e.g., spring types, fastener types, material types, etc.) in order to provide a thorough understanding of the invention. Those skilled in the art will recognize, however, that the invention may be practiced apart from these specific details. In other instances, details of well-known manufacturing practices (e.g., screw turning, plate cutting, molding, etc.) and components have been omitted, so as not to unnecessarily obscure the present invention.

Figure 1:
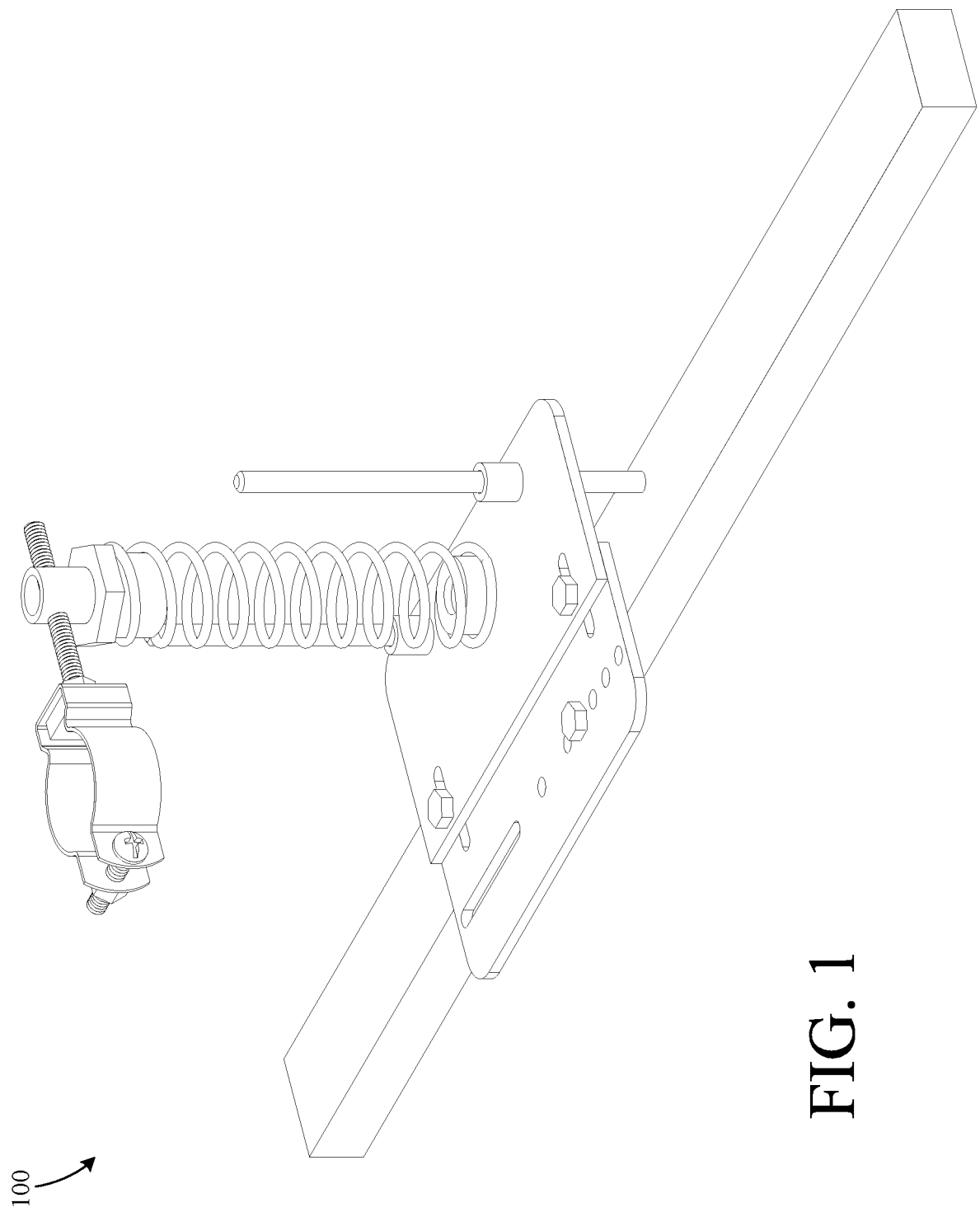
FIG. 1 is a perspective view of an example drill jig.

FIG. 1 shows a perspective view of a drill jig 100 according to one embodiment of the present invention. Drill jig 100 is adapted to be used in conjunction with a drill press (not shown in FIG. 1). More specifically, jig 100 mounts to the quill and table of a drill press (FIGS. 6A-D) to facilitate the drilling of evenly spaced holes along a straight line in a workpiece (e.g., wood, metal, plastic, etc.). Unlike prior art stencils, jig 100 can withstand repeated use without wearing out and, therefore, maintains a high degree of accuracy and precision over time. Furthermore, jig 100 provides a much simpler and time efficient solution to drilling multiple holes in a workpiece as compared to current solutions. Another advantage is that jig 100 is adapted for use with many different drill presses having varying specifications.

Figure 2:
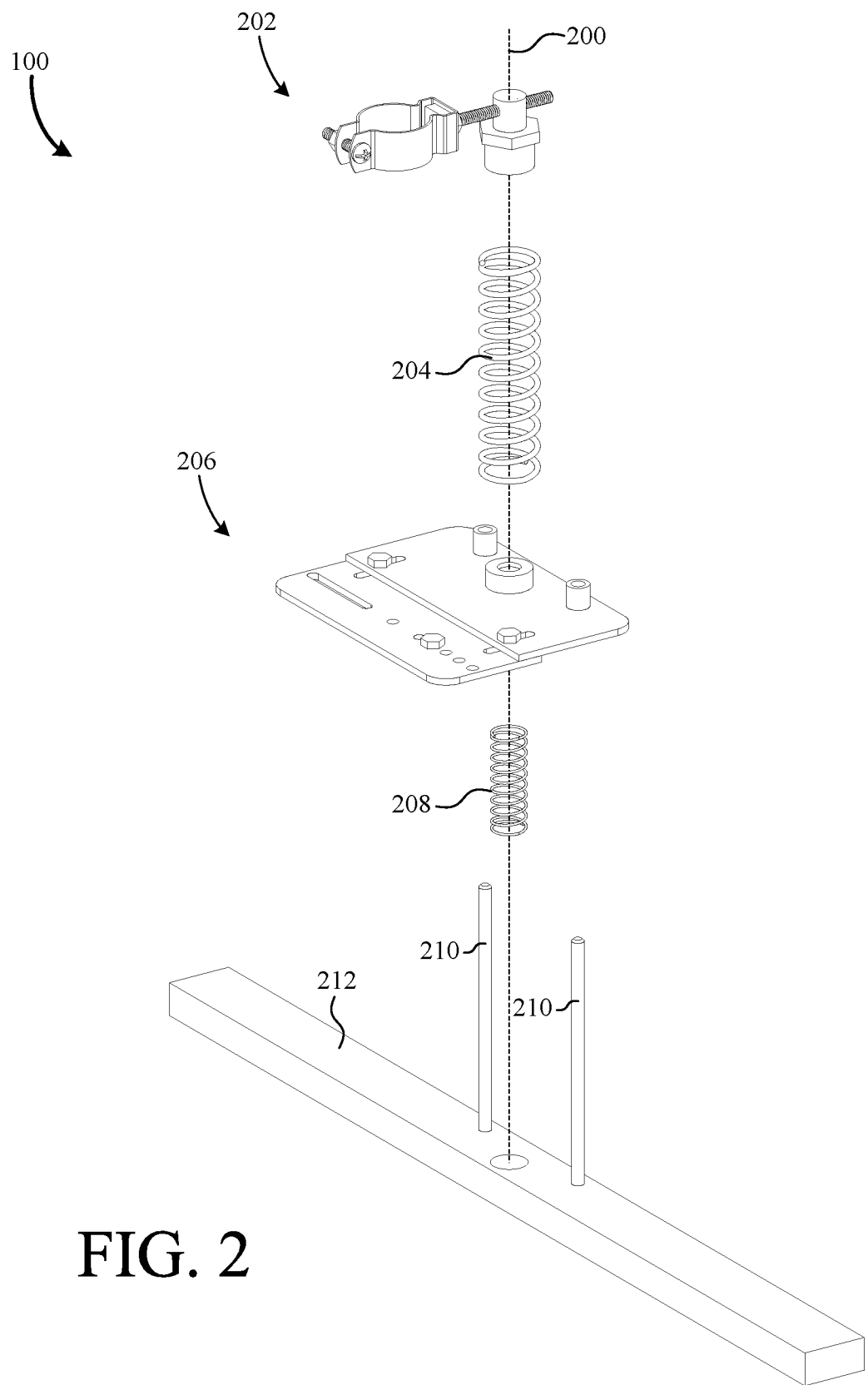
FIG. 2 is an exploded perspective view of the drill jig of FIG. 1.

FIG. 2 shows a perspective view of drill jig 100 exploded along a line 200. Jig 100 includes an actuator 202, a first biasing member 204, a hole-spacing assembly 206, a second biasing member 208, a set of guides 210, and a base 212. Actuator 202 is configured to be fixably mounted around the quill of a drill press and also to seat the top portion of biasing member 204. In response to advancing the chuck of the drill press toward a workpiece, actuator 202 urges downward against biasing member 204. In this example device, biasing member 204 is a relatively stiff spring having a bottom portion that is coupled to hole-spacing assembly 206. Responsive to actuator 202 urging biasing member 204 downward, hole-spacing assembly 206 slides downward along guides 210. As will be discussed in further detail with reference to FIG. 4, hole-spacing assembly 206 is adapted to engage a hole previously drilled in a workpiece, such that the subsequent hole will be a precise, predetermined distance from the previously drilled hole. In this example device, biasing member 208 is also a spring having a top portion and a bottom portion coupled to hole-spacing assembly 206 and base 212, respectively. In this example, guides 210 are parallel slider rods that extend vertically from base 212 to limit hole-spacing assembly 206 to only vertical movement. Base 212 is a rigid body that is adapted to be fixably mounted on a drill press table and provides an alignment edge for a workpiece.

Figure 3:
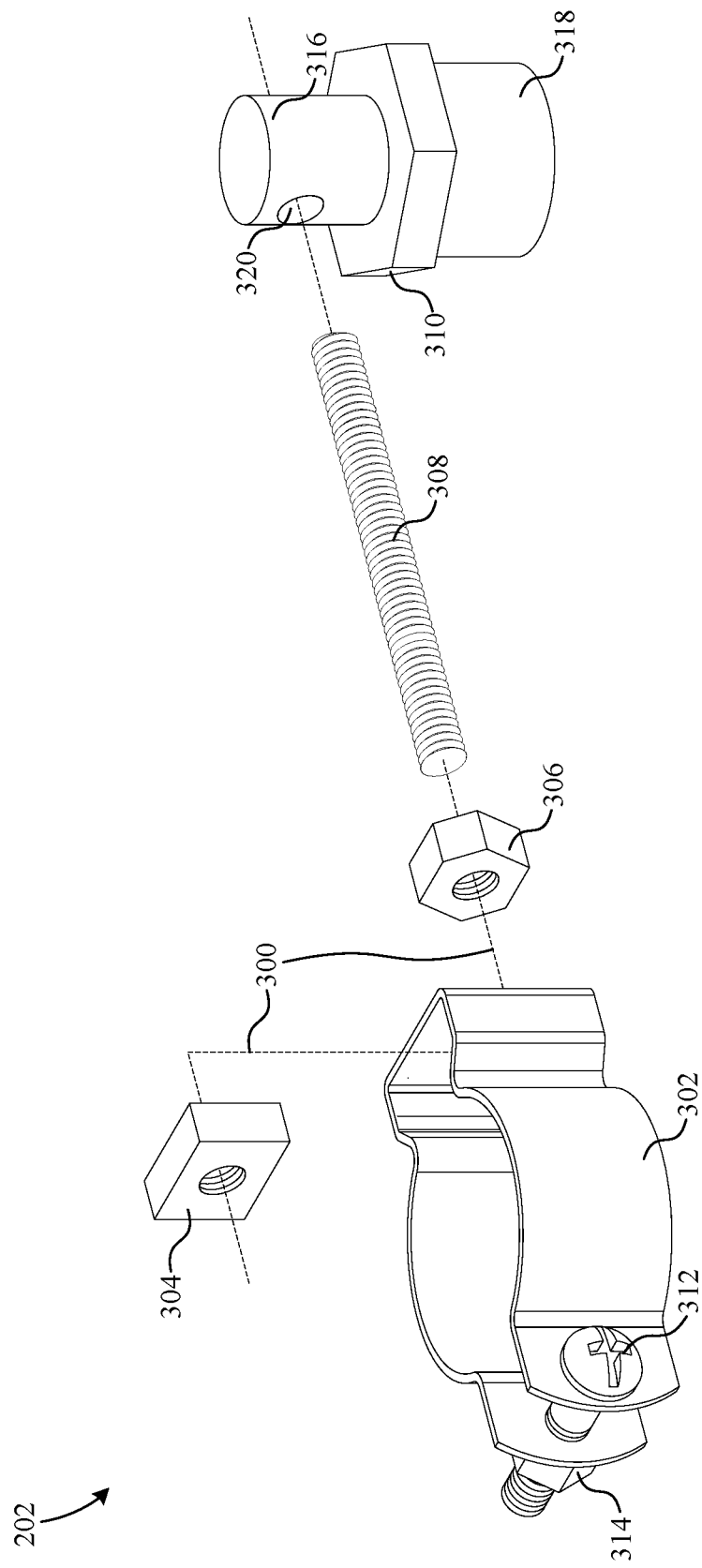
FIG. 3 is an exploded perspective view of an actuator of the drill jig of FIG. 1.

FIG. 3 is a perspective view of actuator 202 exploded along a line 300. Actuator 202 is configured to be vertically fixed with respect to a drill chuck and to urge biasing member 204 downward responsive to advancing the drill chuck downward. Actuator 202 includes a clamp 302, a square nut 304, a nut 306, a threaded shaft 308, and a coupler 310. In this example, clamp 302 is configured to be fixed around the quill of a drill press. Clamp 302 includes a screw 312 and a corresponding nut 314 that allows clamp 302 to be mounted around quills of varying diameters within a predetermined range. Clamp 302 further includes an aperture (not visible) through which shaft 308 is disposed when actuator 202 is assembled. Shaft 308 is fixed to clamp 302 by nuts 304 and 306, which are positioned on opposite sides of clamp 302. That is, square nut 304 and nut 306 are threaded onto shaft 308 with the rear wall of clamp 302 tightened therebetween. The outer surfaces of square nut 304 engage the interior of clamp 302 such that square nut 304 does not rotate during the tightening of nut 306 onto threaded shaft 308. Coupler 310 is a rigid body that includes a top portion 316 and a bottom portion 318. Top portion 316 includes a through-hole 320 configured to receive shaft 308. Bottom portion 318 is a cylindrical shell sized to seat the top portion of biasing member 204.

Figure 4:
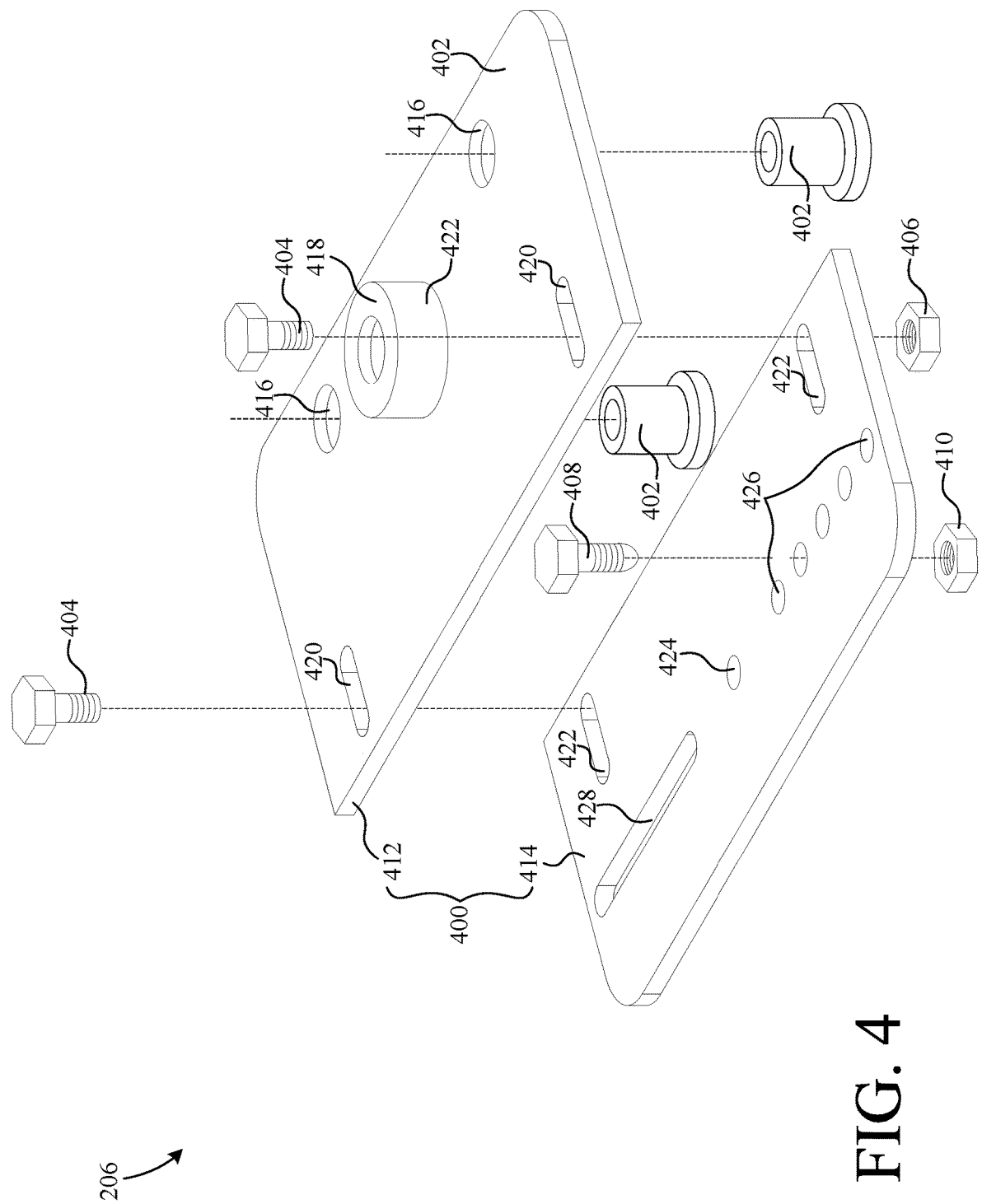
FIG. 4 is an exploded perspective view of a hole-spacing assembly of the drill jig of FIG. 1.

FIG. 4 is an exploded perspective view of hole-spacing assembly 206 which includes a rigid body 400, a set of bushings 402, a set of bolts 404, a set of nuts 406, a protrusion 408, and a nut 410.

In the example embodiment, rigid body 400 is made up of two plates 412 and 414 that are held together by bolts 404 and corresponding nuts 406 when jig 100 is assembled. Plate 412 is configured to slidably engage guides 210 of base 212 (FIG. 2) and to be adjustably fixed to plate 414. Plate 414 is configured to support and position protrusion 408 relative to plate 412. Plate 412 includes a pair of apertures 416, a spring seat 418, and a pair of slots 420.

Apertures 416 provide openings in which bushings 402 are retained. Optionally, bushings 402 may be further secured in apertures 416 via a set of respective fasteners such as, for example, press clips, C-clips, etc. Spring seat 418 is sized to fit within and/or engage the interior of the bottom portion of biasing member 204, to maintain alignment therebetween. In this example, spring seat 418 is an integral feature of plate 412. However, spring seat 418 may optionally be an external component that is fastened to plate 412 such as, for example, a thick washer bolted onto plate 412. Slots 420 and an additional set of slots 422 of plate 414 are adapted to each receive an associated one of bolts 404. Slots 420 and 422 are elongated such that the horizontal distance between plate 414 and base 212 can be adjusted. By adjusting this distance, the distance between the edge of a workpiece and the drill holes of the workpiece can be adjusted. To increase the distance, bolts 404 are loosened, plates 412 and 414 are pulled laterally away from each other, and bolts 404 are then retightened. To decrease this distance, bolts 404 are loosened, plates 412 and 414 are urged laterally toward each other, and bolts 404 are then retightened.

Optionally, one or more cylindrical apertures can be substituted for each of slots 420 and 422, so that plate 414 can be flipped upside down (to swap the positions of slot 428 and adjustment apertures 426) and mounted without having to laterally realign plate 414 with respect to plate 412.

Plate 414 further includes a drilling aperture 424, a set of discrete adjustment apertures 426, and a slot 428 all aligned along the same straight line. Drilling aperture 424 provides an opening through which a drill bit passes when jig 100 is actuated. Aperture 424 also facilitates the alignment of jig 100 with respect a drill press during the mounting of jig 100 to the drill press table. For example, prior to fixing base 212 to the drill press table, the drill bit is advanced downward and the position of jig 100 with respect to the table is changed until the drill bit is aligned sufficient to pass through aperture 424. While the drill bit is disposed through aperture 424, base 212 is clamped to the table (FIG. 6A) in a fixed position such that the bit will advance through aperture 424 along the same path every time the drill chuck is advanced downward.

Discrete adjustment apertures 426 are each configured to receive protrusion 408. As shown, each of adjustment apertures 426 are in-line with aperture 424 but are located at different distances from aperture 424. This allows the user to have a discrete number of options in terms of where to place protrusion 408. Of course, the distance between protrusion 408 and aperture 424 dictates the distance between adjacent drill holes in the workpiece. This is because protrusion 408 is configured to engage a hole previously drilled in the workpiece. In this example, adjustment apertures 426 are shown evenly spaced apart. Those skilled in the art, however, will recognize that adjustment apertures 426 can also be located at varying distances, if desirable for a particular application. Slot 428 is also adapted to receive protrusion 408 but provides a continuous range of optional positions of protrusion 408 with respect to aperture 424. That is, protrusion 408 can be secured anywhere along slot 428 and is not limited to a finite number of discrete positions, as is the case when protrusion 408 is mounted in one of adjustment apertures 426. Another important aspect of plate 414 is that it can be flipped over such that the positions of slot 428 and adjustment apertures 426 are interchangeable.

FIG. 5 shows a perspective view of base 212 with guides 210 exploded therefrom. Base 212 is a rigid, elongated body formed from, in this example, laminated wood. Note that base can alternately formed from other materials including, but not limited to, plastic, metal, etc. Base 212 defines a cylindrical recess 500, a pair of apertures 502, and an edge alignment guide 504. Recess 500 is configured to receive and seat the bottom portion of biasing member 208. Each of apertures 502 is configured to receive a respective one of guides 210. In this example, guides 210 are press-fit into apertures 502. However, those skilled in the art will recognize that guides 210 can be attached to base 212 by any suitable means (e.g., threads, adhesive, etc.) without departing from the main scope of the present invention. Alignment guide 504 is a planar surface configured to slidably engage the edge of a workpiece during hole drilling operations of jig 100. By maintaining abutment between the workpiece and alignment guide 504, while the workpiece is advanced along jig 100, a consistent distance between the drill holes and the edge of the workpiece is maintained.

Alternate alignment guides may be substituted for the flat planar surface of alignment guide 504. For example, a set of two or more protrusions adapted to slidably engage a workpiece may extend laterally from base 212. Such protrusions may also include components and/or features (e.g., rollers, wheels, etc.) that minimize friction with the workpiece. Additionally, such protrusions can be adjustable.

The operation of jig 100 will now be described with reference to FIGS. 6A-6D.

Figure 6A:
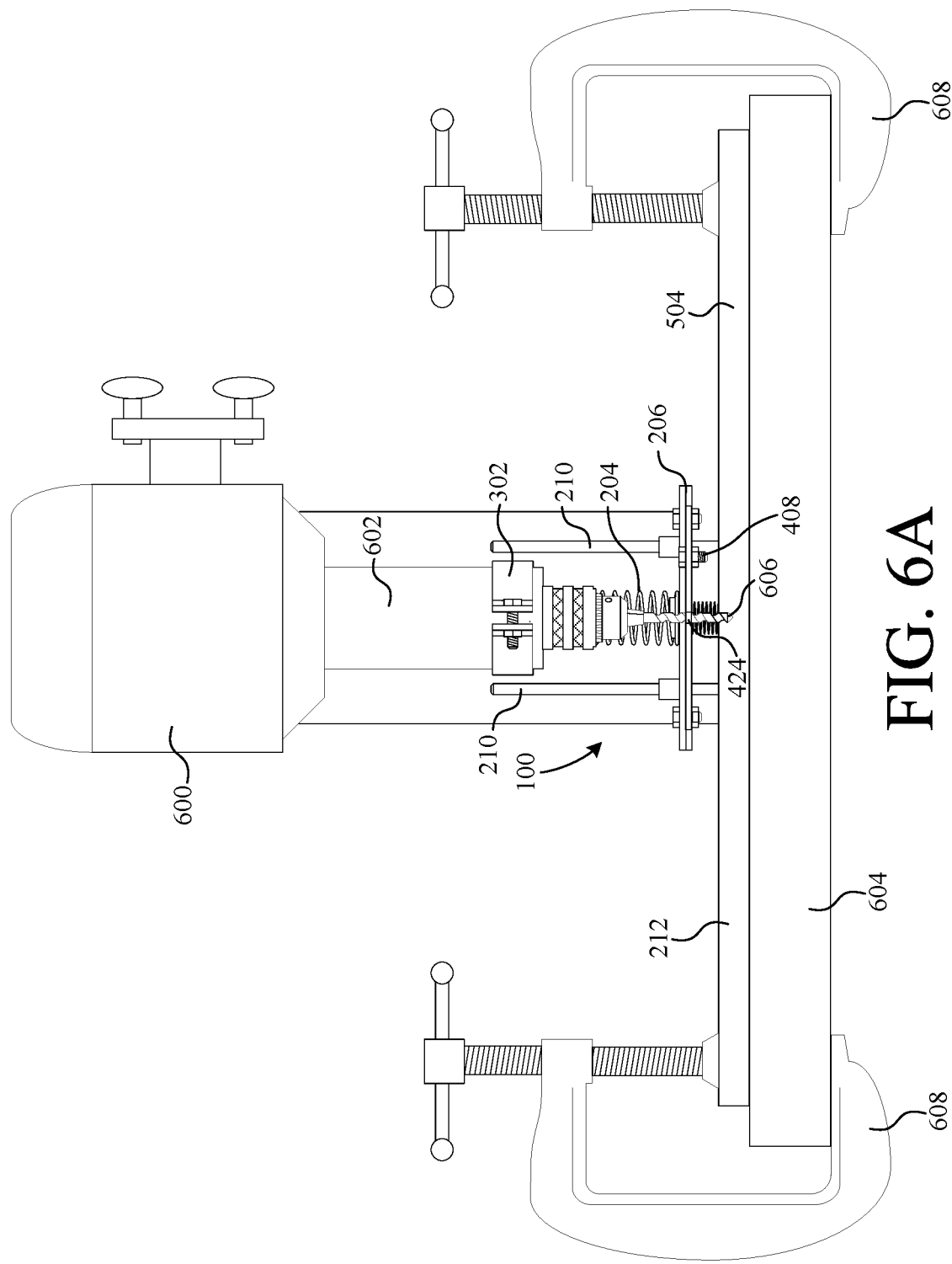
FIG. 6A is a front view of the drill jig of FIG. 1 during the initial coupling of the drill jig to a drill press.

Prior to use, jig 100 is positioned and mounted on a drill press 600 as depicted in FIG. 6A. This involves first attaching clamp 302 of actuator 202 to the quill 602 of drill press 600. With clamp 302 attached to quill 602, base 212 is positioned on the table 604 of drill press 600 such that aperture 424 is approximately coaxially aligned with the drill bit 606 of drill press 600. Next, drill press 600 is actuated thereby advancing quill 602 and drill bit 606 downward toward aperture 424. While drill bit 606 is advancing downward, the lateral position of base 212 is adjusted until drill bit 606 passes through aperture 424. With drill bit 606 disposed through aperture 424, base 212 is fixed to table 604 using a set of C-clamps 608. As long as base 212 remains clamped to table 604, drill bit 606 will pass through aperture 424 every time quill 602 is advanced downward. Optionally, drill bit 606 can be substituted with a cylindrical alignment pin during the process of aligning plate 414 to achieve more accurate alignment. This is because the drill fluting could allow bit 606 to be disposed in aperture 424 even when they are not exactly coaxial. Another option is to mount bit 606 upside down in the chuck during the alignment of plate 414 such that the cylindrical end is disposed in aperture 424.

Figure 6B:
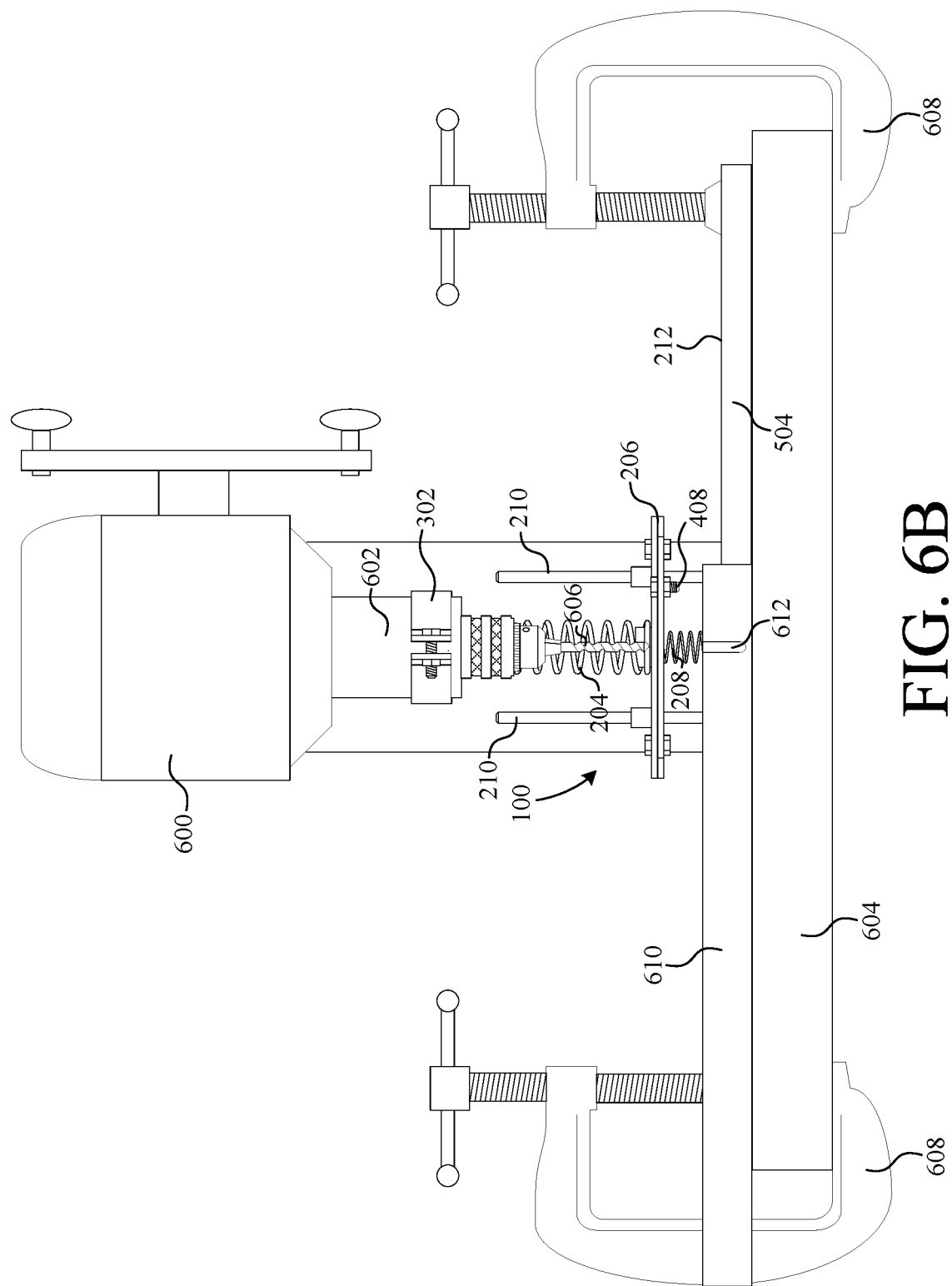
FIG. 6B is a front view of the drill jig of FIG. 1 coupled to a drill press in a non-actuated position.

Once jig 100 is mounted to drill press 600, quill 602 is retracted and a workpiece 610 is positioned on table 604 against alignment guide 504, as depicted in FIG. 6B. When quill 602 is retracted, jig 100 is in a non-actuated position, wherein both biasing members 204 and 208 are in a relaxed state. Next, an initial hole 612 is drilled into workpiece 610.

Figure 6C:
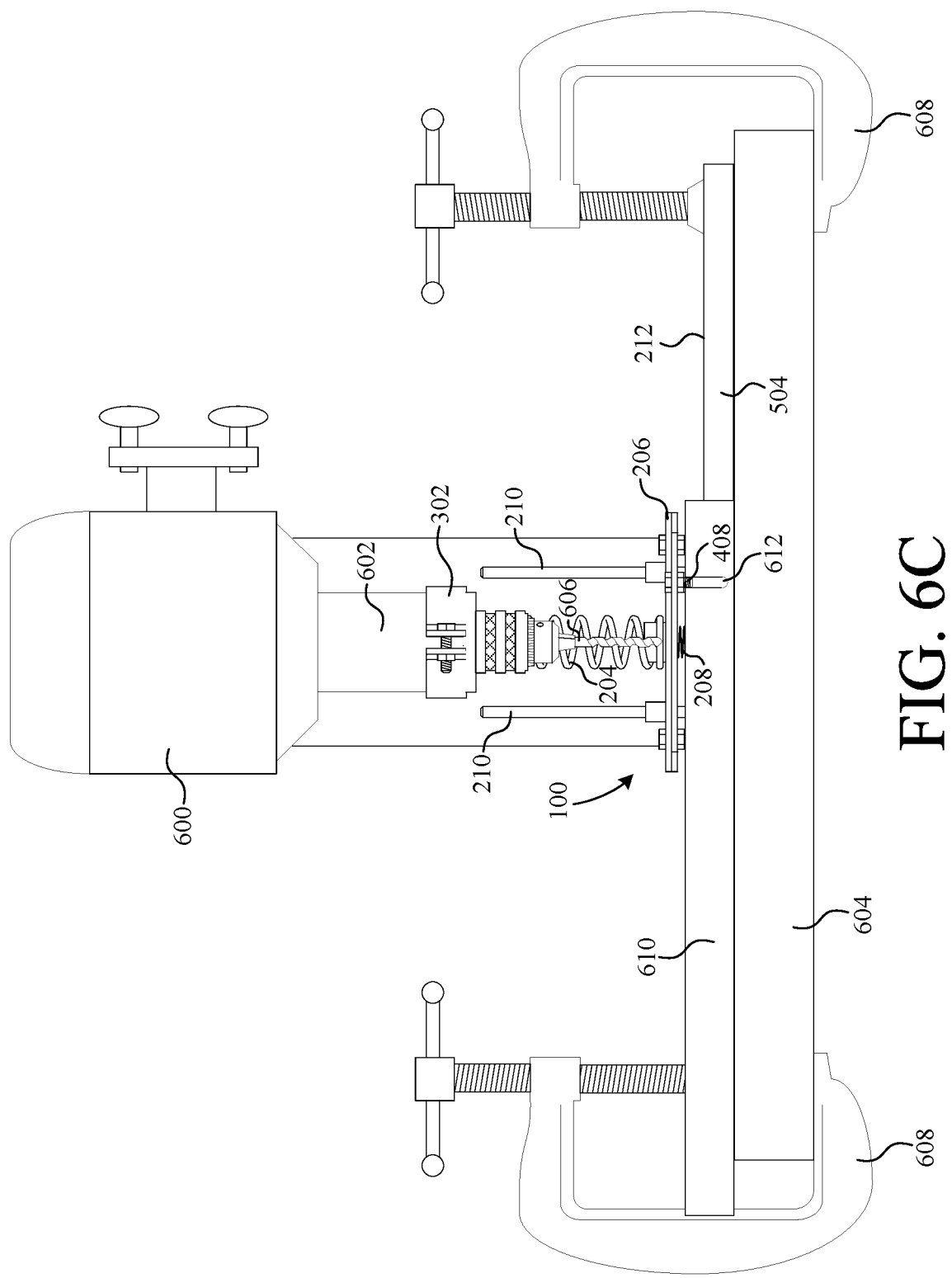
FIG. 6C is a front view of the drill jig of FIG. 1 coupled to a drill press in a semi-actuated position.

After initial hole 612 is drilled into workpiece 610, workpiece 610 is advanced to the right to approximately align initial hole 612 with protrusion 408. Then, quill 602 is advanced downward, as depicted in FIG. 6C. As quill 602 advances downward, actuator 202 urges biasing member 204 downward. Because biasing member 204 is stiffer than biasing member 208, biasing member 208 compresses before biasing member 204. As a result, hole-spacing assembly 206 advances downward as actuator 202 advances downward. As hole-spacing assembly 206 approaches workpiece 610, the lateral position of workpiece 610 is adjusted slightly along guides 504 until protrusion 408 engages initial hole 612.

Figure 6D:
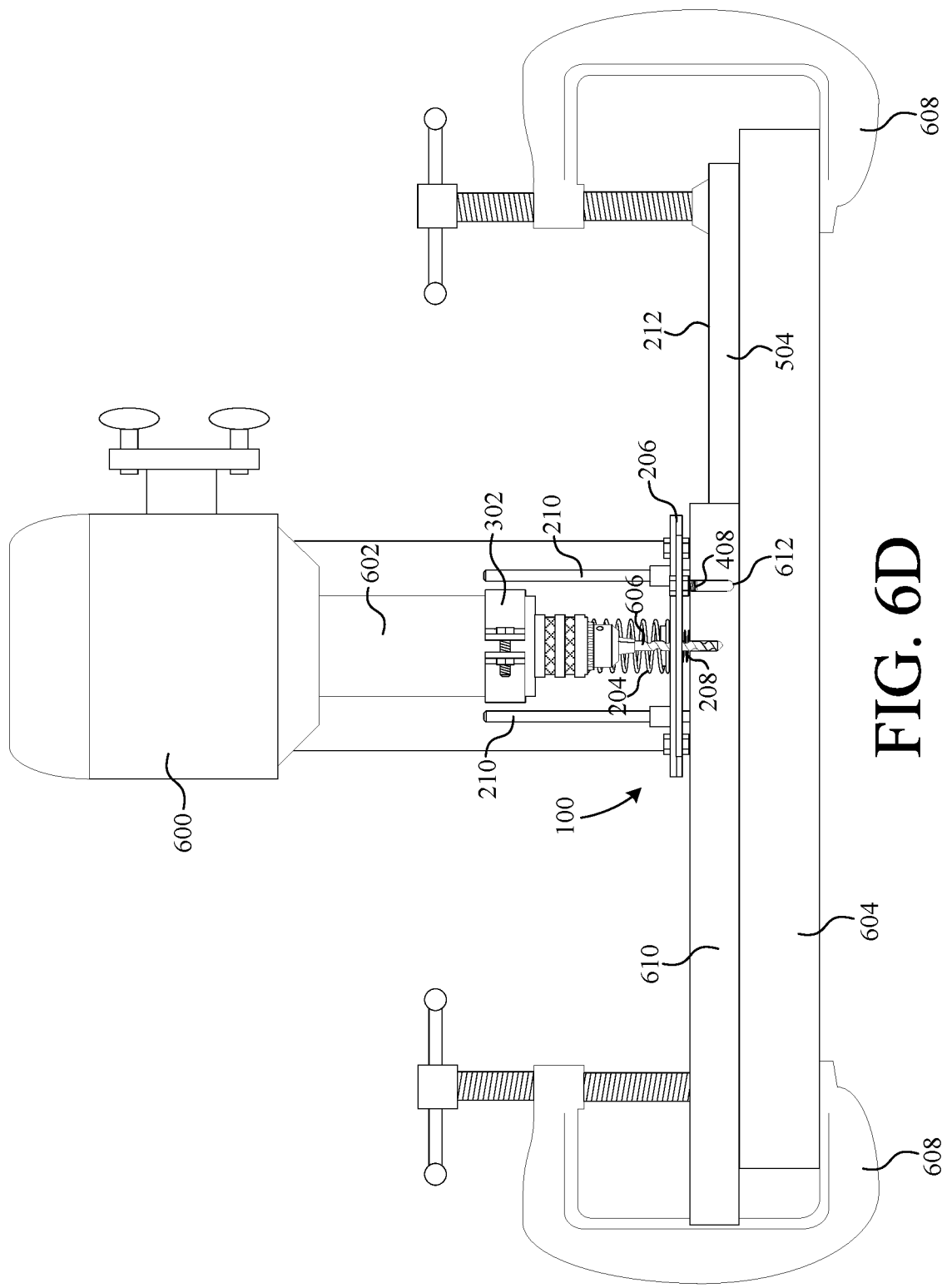
FIG. 6D is a front view of the drill jig of FIG. 1 coupled to a drill press in an actuated position.

Once protrusion 408 engages initial hole 612, the advancement of hole-spacing assembly 206 stops, while actuator 202 continues to advance downward as depicted in FIG. 6D. As actuator 202 continues to advance, biasing member 204 begins to compress, thereby allowing drill bit 606 to advance into workpiece 610. Once a sufficient bore depth is achieved, quill 602 is retracted, thereby decompressing springs 204 and 208. Of course, decompression of springs 204 and 208 causes hole-spacing assembly 206 to return to a non-actuated position, lifting protrusion 208 from initial hole 612. Finally, workpiece 610 is fed to the right and the process is repeated, each time with protrusion 208 engaging the most recently drilled hole, until a predetermined number of linearly aligned, and evenly spaced apart, holes have be bored.

Figure 7:
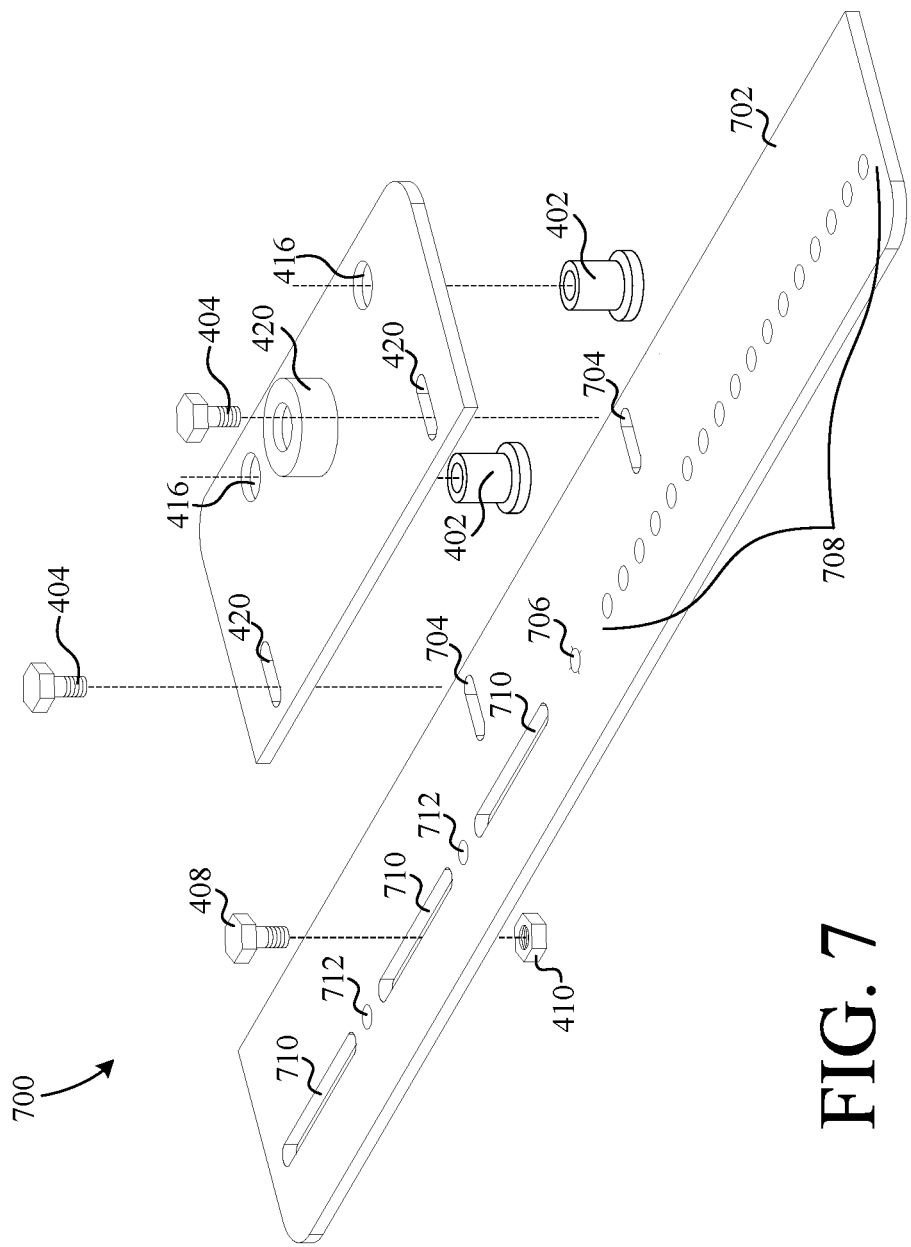
FIG. 7 is an exploded perspective view of an alternate hole-spacing assembly.

FIG. 7 is an exploded perspective view of an alternate, assembly 700. Hole-spacing assembly 700 is substantially similar to hole-spacing assembly 206, except that plate 414 has been substituted with alternate plate 702. Therefore, the features and elements of hole-spacing assembly 700 that are identical to those of hole-spacing assembly 206 are denoted by like reference numbers and withheld from the following description to avoid redundancy.

Plate 702 includes a set of slots 704, a drilling aperture 706, a set of discrete adjustment apertures 708, a second set of slots 710, and a second set of discrete apertures 712. Slots 704 are configured to receive bolts 404 to facilitate the adjustable mounting of plate 702 to plate 412. Drilling aperture 706 is substantially identical to drilling aperture 424 of plate 414, in that it provides an opening through which a drill bit passes when jig 100 is actuated. Aperture 706 also facilitates the alignment of jig 100 with respect to a drill press during the mounting of jig 100 to the drill press table. Adjustment apertures 708 are each configured to receive protrusion 408. As shown, each of adjustment apertures 708 are in-line with aperture 706, but spaced therefrom at different distances. This allows the user to have a discrete number of options in terms of where to place protrusion 408. As in previously described example embodiments, the distance between protrusion 408 and aperture 706 dictates the distance between adjacent drill holes in the workpiece. Slots 710 are also adapted to receive protrusion 408, but provide discrete, continuous ranges of optional positions of protrusion 408 with respect to aperture 706. By having multiple discrete slots 710, as opposed to a single long slot, the strength of plate 702 is increased. Discrete apertures 712 can also receive protrusion 408 and provide yet another option with respect to where protrusion 408 can be placed along plate 702 (i.e., between slots 710).

Figure 8:
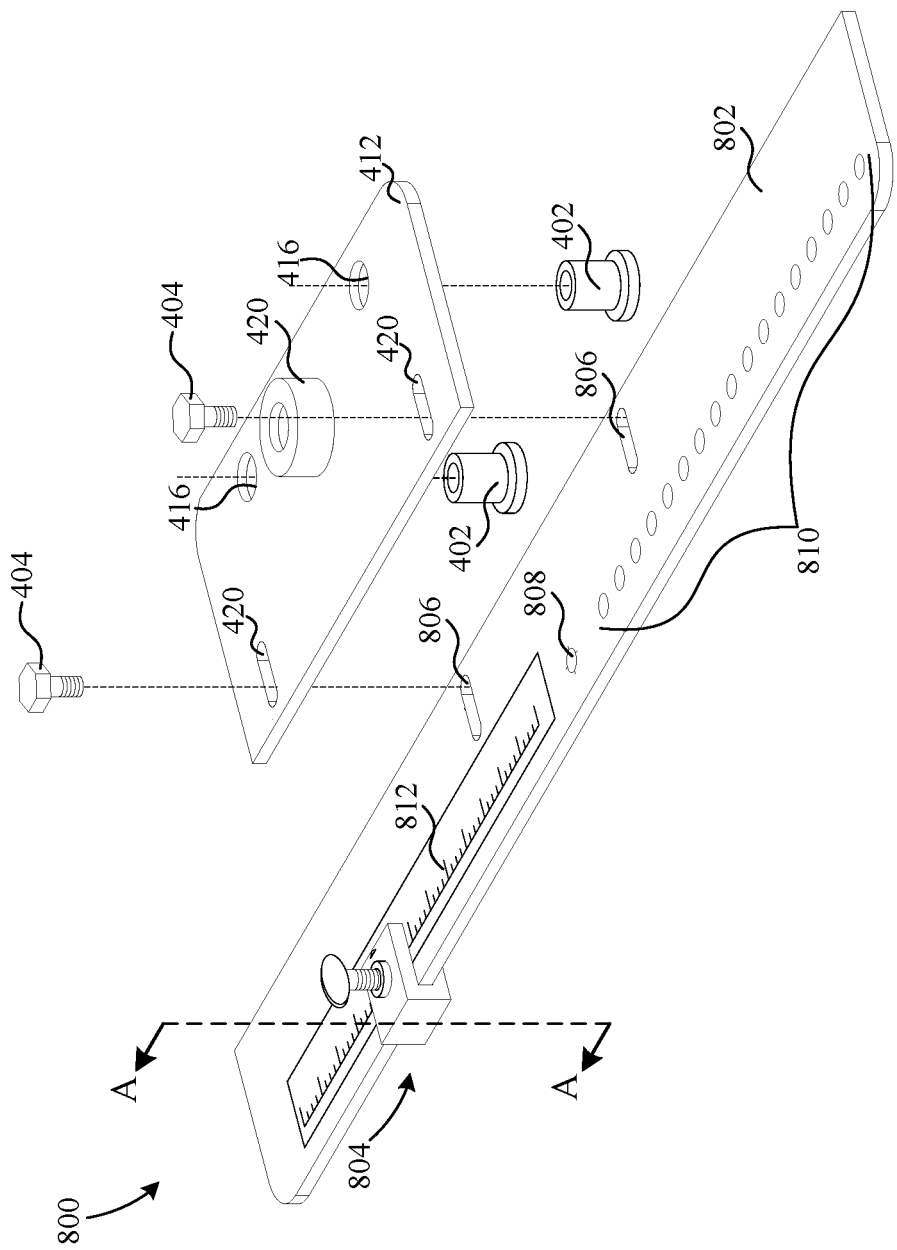
FIG. 8 is an exploded perspective view of another alternate hole-spacing assembly.

FIG. 8 is an exploded perspective view of another example hole-spacing assembly 800. Hole-spacing assembly 800 is substantially similar to hole-spacing assembly 206, except that plate 414 and protrusion 408 have been replaced with an alternate plate 802 and slider assembly 804, respectively. Therefore, the features and elements of hole-spacing assembly 800 that are identical to those of hole-spacing assembly 206 are denoted by like numbers and withheld from the following description to avoid redundancy.

Plate 802 includes a set of slots 806, a drilling aperture 808, a set of discrete adjustment apertures 810, and indicia 812. Slots 806 are configured to receive bolts 404 to facilitate the coupling and lateral adjustment of plate 802 with respect to plate 412. Drilling aperture 808 is substantially identical to drilling aperture 424 of plate 414 in that it provides an opening through which a drill bit passes when jig 100 is actuated. Aperture 808 also facilitates the alignment of jig 100 with respect to a drill press during the mounting of jig 100 to the drill press table. Discrete adjustment apertures 810 are each configured to receive protrusion 408 to provide an alternative to slider assembly 804. That is, a user can optionally remove slider assembly 804, position protrusion 408 in any one of adjustment apertures 810, and use jig 100 as previously described. As shown, each of adjustment apertures 810 is in-line with drilling aperture aperture 808, but located at different distances from drilling aperture 808. This allows the user to have a discrete number of options in selecting where to place protrusion 408. Indicia 812 indicates the linear distance between drilling aperture 808 and a protrusion 814 (shown in FIG. 9) located at the bottom of slider assembly 804. In the example embodiment, indicia 812 is a printed substrate adhered to the top surface of plate 802. However, indicia 812 may be formed directly on plate 802 by some suitable means including, but not limited to, molding, engraving, painting, etc.

Slider assembly 804 is coupled to slide along plate 802, so that protrusion 814 can be selectively positioned at any distance from drilling aperture 808, within the range of indicia 812. Once in position, slider assembly 804 is also configured to be fixed in place with respect to plate 802, as will be described with reference to upcoming FIG. 9.

Figure 9:
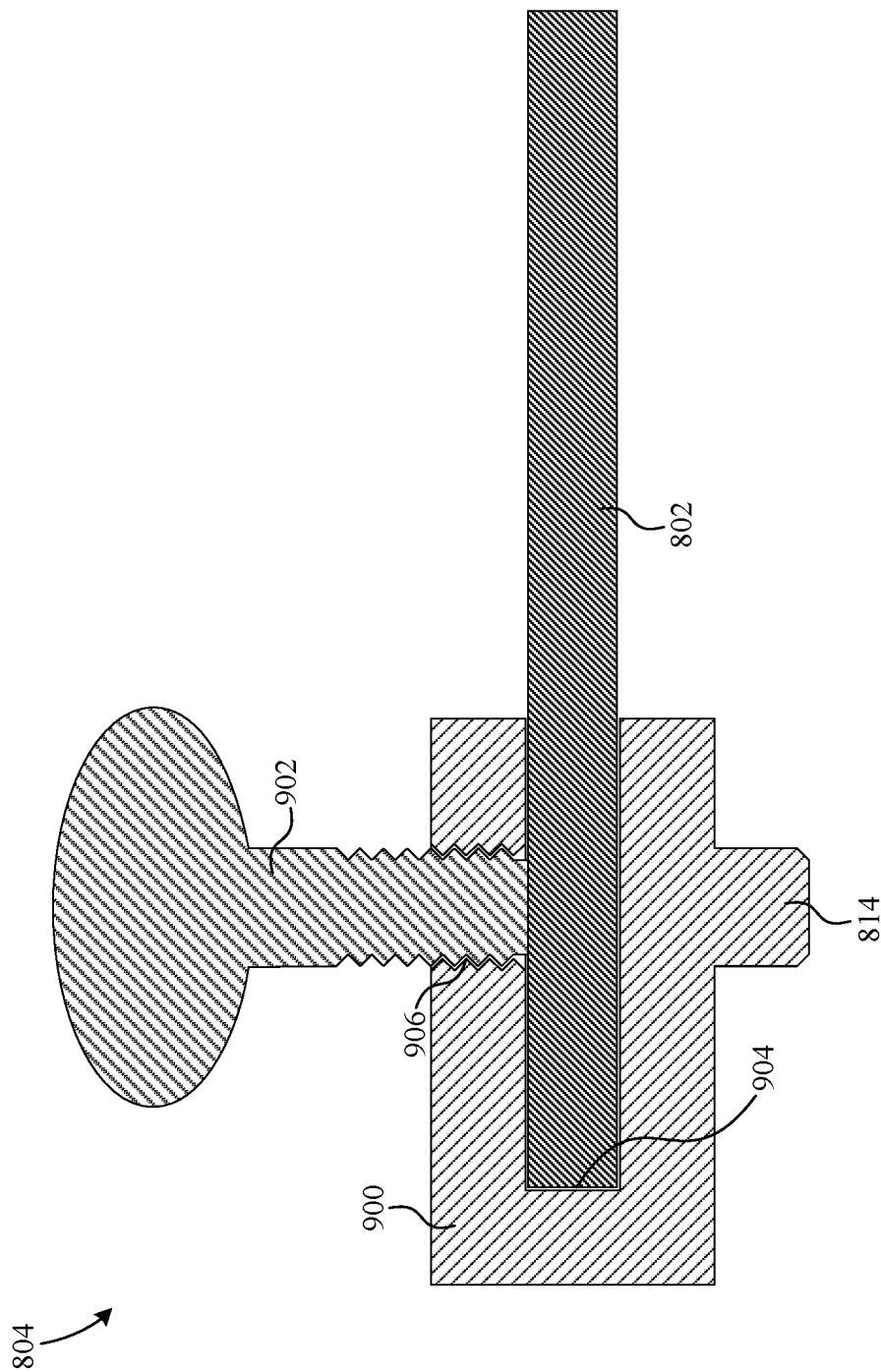
FIG. 9 is a cross-sectional view of the hole-spacing assembly of FIG. 8.

FIG. 9 is a cross-sectional view of slider assembly 804 taken along line A-A of FIG. 8. Slider assembly 804 includes a body 900 and a thumb screw 902. Body 900 is a rigid C-shaped member defining an internal channel 904, protrusion 814, and a threaded aperture 906. Channel 904 is adapted to slidably engage the outer surface of plate 802 such that protrusion 814 remains in-line with drilling aperture 808 regardless of the distance therebetween. Protrusion 814 functions similar to protrusion 408 in that it is adapted to engage a previously drilled hole. Threaded aperture 906 is configured to receive thumb screw 902 such that body 900 can be fixed in place along plate 802 by tightening screw 902. Of course, the user can adjust the position of body 900 along plate 802 by loosening screw 902, moving the position of body 900 to a desired point along indicia 812, and then retightening screw 902.

Figure 10:
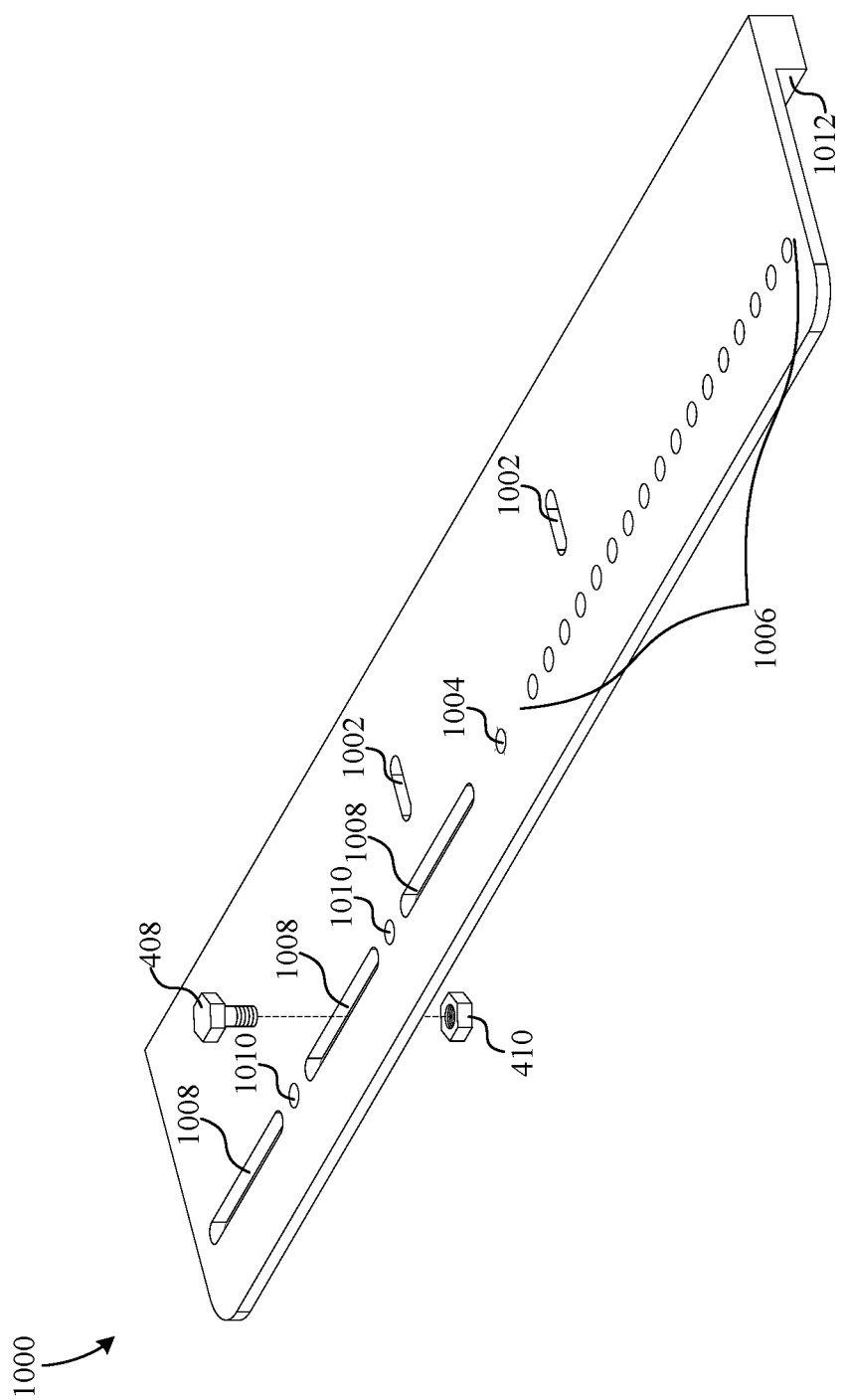
FIG. 10 is a perspective view of an example drill attachment.

FIG. 10 is a perspective view of a drill attachment 1000 that mounts on a drill to facilitate the drilling of linearly aligned, evenly spaced holes in a workpiece. In the example embodiment, attachment 1000 is formed from polycarbonate which is both rigid and transparent. The transparency of attachment 1000 allows the user to see the underlying workpiece when drilling holes therein.

Attachment 1000 includes a set of mounting slots 1002, a drilling aperture 1004, a set of discrete adjustment apertures 1006, a set of adjustment slots 1008, a second set of discrete apertures 1010, and an alignment guide 1012. Slots 1002 facilitate the mounting of attachment 1000 to a drill (e.g., a portable drill press, a hand-held drill motor, etc.). Drilling aperture 1004 provides an opening through which a drill bit passes during the operation of attachment 1000. Discrete adjustment apertures 1006 are each configured to selectively receive protrusion 408. As shown, each of adjustment apertures 1006 are in-line with drilling aperture 1004, but is spaced a different distance from drilling aperture 1004. The spaced apertures 1006 provide a user with a discrete number of positioning options for protrusion 408. The distance between protrusion 408 and aperture 1004 dictates the distance between drill holes in the workpiece. Slots 1008 are also adapted to receive protrusion 408 but provide discrete continuous ranges of optional positions of protrusion 408 with respect to aperture 1004. Having multiple discrete slots 1008, as opposed to a single long slot, increases the strength of attachment 1000. Discrete apertures 1010 provide additional options for positioning protrusion 408 along attachment 1000, between slots 1008. Alignment guide 1012 is flat planar surface that is adapted to engage a workpiece during drilling operations such that a sequence of holes drilled in the workpiece are in a straight line parallel to the edge of the workpiece. As shown in FIG. 10, alignment guide 1012 is formed integrally (e.g., machined, cast, etc.) with the body of attachment 1000. Alternatively, alignment guide 1012 can include a separate structure fixed (e.g., bolted, welded, adhered, etc.) to the body of attachment 1000.

Figure 11:
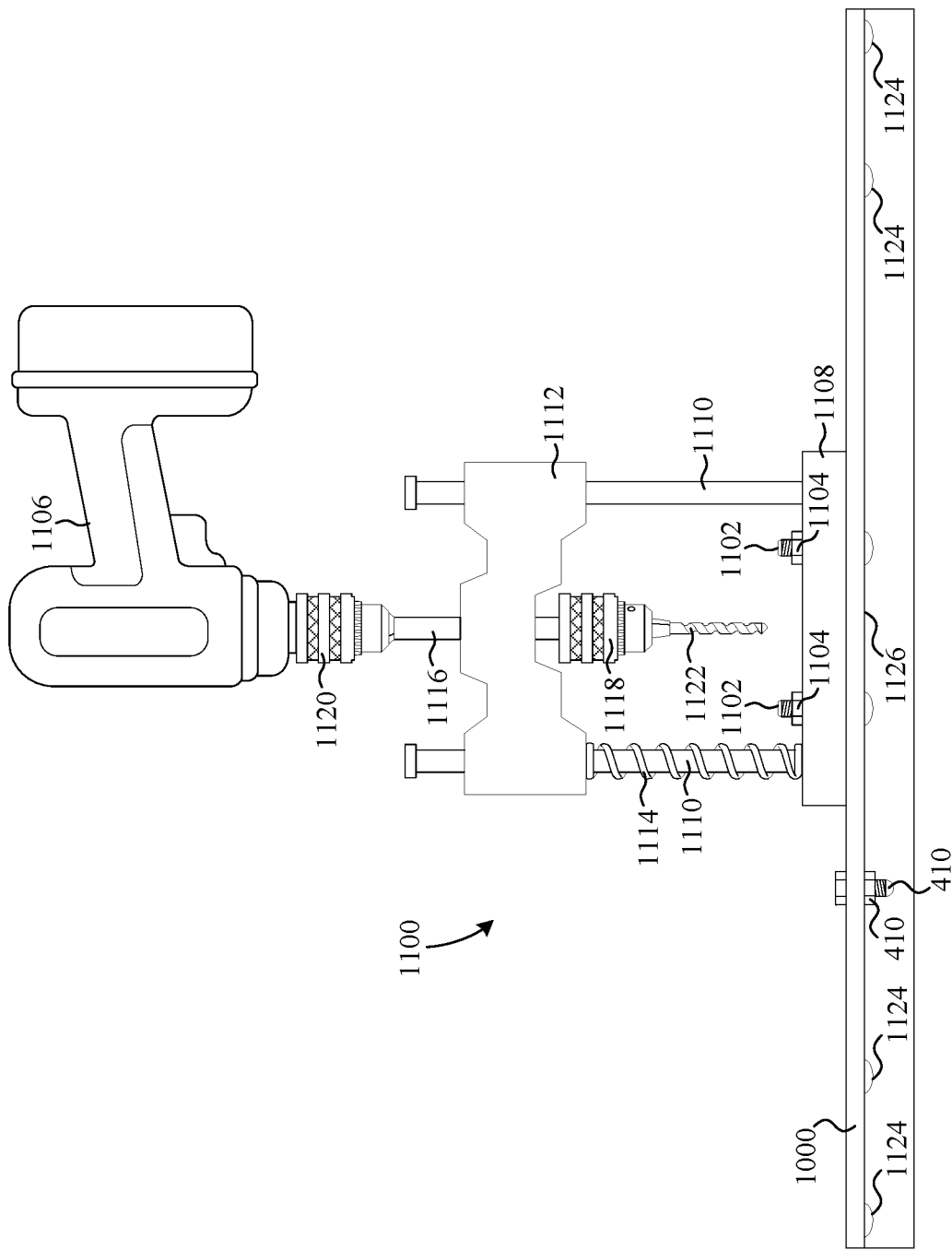
FIG. 11 is a front view of the drill attachment of FIG. 10 mounted on a portable drill press.

FIG. 11 shows a front view of attachment 1000 mounted to a portable drill press 1100, via a set of screws 1102 and an associated set of nuts 1104. Portable drill press 1100 is coupled to, and driven by, a portable drill 1106. This combination provides a portable means for drilling linearly aligned and evenly spaced holes in workpieces that might be too large and/or inconvenient for a standard drill press. For example, if a workpiece is already fixed vertically to a wall, but requires evenly spaced and linearly aligned drill holes, it would be beneficial to use attachment 1000 to drill the holes rather than to remove the workpiece, drill the holes on a press, and reattach the workpiece to the wall.

Portable drill press 1100 includes a base 1108, a set of guides 1110, a frame 1112, a biasing member 1114, a drive shaft 1116, and a chuck 1118. Base 1108 is a rigid structure that facilitates the mounting of portable drill press 1100 to attachment 1000. Guides 1110 are rigid parallel rods that are fixably attached to base 1108 to extend perpendicularly therefrom. Frame 1112 is a rigid structure coupled to slide downward along guides 1110 in response to urging portable drill 1106 toward attachment 1000. Biasing member 1114 is operative to urge frame 1112 away from attachment 1000, so that chuck 1118 is returned to a retracted position when drill 1106 is not urged toward attachment 1000. In the example embodiment, biasing member 1114 is a coil spring that is coaxially disposed around one of guides 1110, between base 1108 and frame 1112. Drive shaft 1116 extends through frame 1112 and is free to rotate therein. Drive shaft 1116 is also vertically fixed with respect frame 1112, so that urging shaft 1116 downward also urges frame 1112 downward. Chuck 1118 is fixed to the bottom end of drive shaft 1116 and rotates responsive to rotating the top of drive shaft 1116 using drill 1106. In this example, the top end of drive shaft 1116 is engaged in a chuck 1120 of drill 1106, and a drill bit 1122 is rotated when drill 1106 rotates drive shaft 1116. Portable drill press 1100, attachment 1000, and drill 1106, together, operate similar to jig 100 and drill press 600, in that protrusion 408 engages a previously drilled hole in order provide a reference location for the subsequently drilled hole. Unlike jig 100, portable drill press 1100 can be moved relative to the workpiece rather than feeding the workpiece to the cutting tool.

A plurality of standoffs 1124 define a planar surface to abut the top surface of a workpiece. Standoffs 1124 provide clearance for nut 410, the heads of screws 1102, and any other attachment devices that project below the under surface 1126 of attachment 1000. In the embodiment of FIG. 10, standoffs 1124 are bumps. However, standoffs 1124 can be any convenient structures including, but not limited to, spaced ribs running the length of attachment 1000.

In the previously described embodiments, plate 412, plate 414, plate 702, plate 802, and drill attachment 1000 are all formed from rigid transparent material, thereby enabling a user to see the workpiece therethrough. More specifically, plate 412, plate 414, plate 702, plate 802, and drill attachment 1000 can all be formed from polycarbonate. This helps the user see the underlying workpiece during drilling operations. In alternate embodiments, however, any of plate 412, plate 414, plate 702, plate 802, and drill attachment 1000 can be formed from other transparent materials (e.g. acrylic glass) and/or opaque materials (e.g., metal, plastic, wood, etc.).

Figure 12:
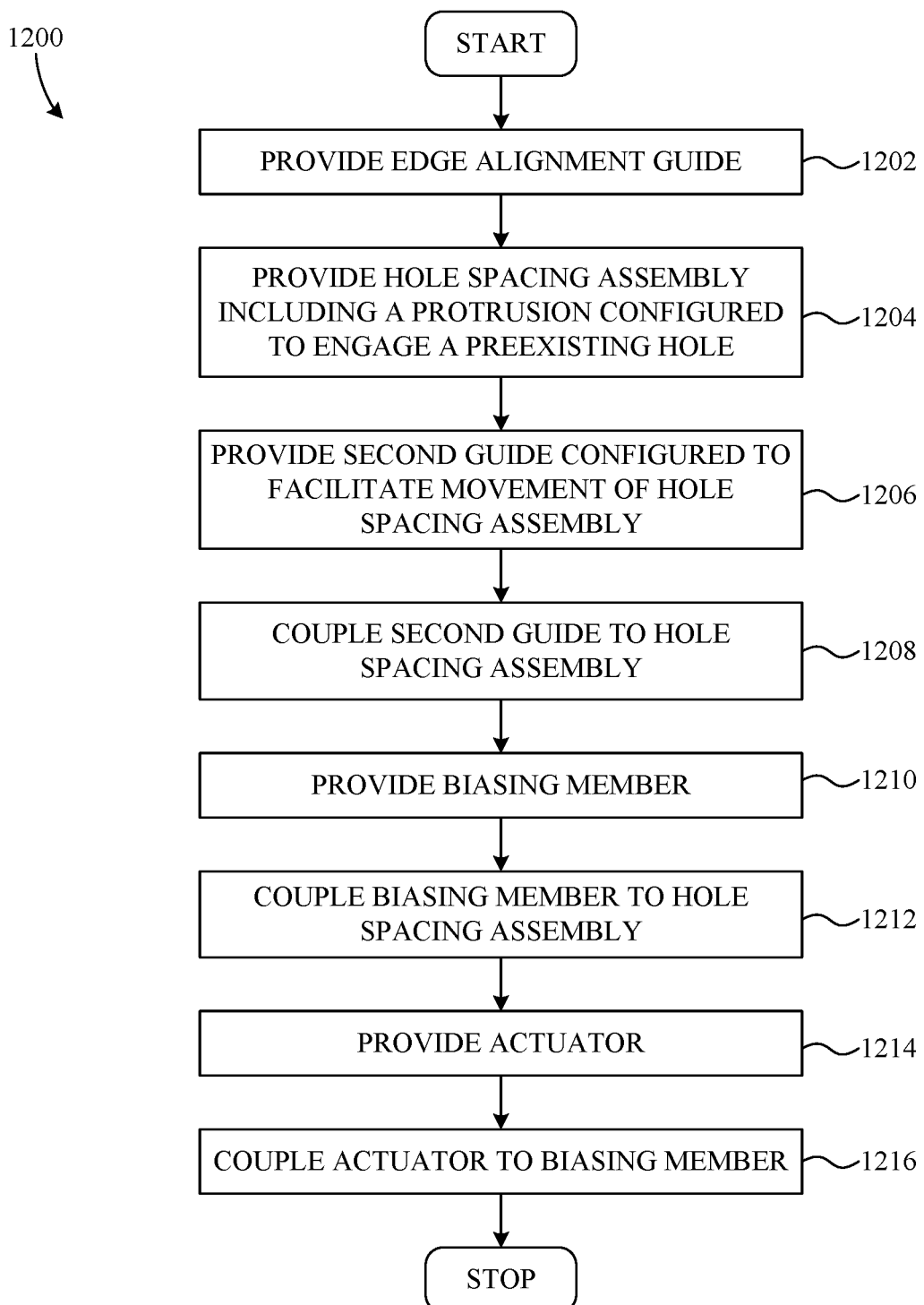
FIG. 12 is a flowchart summarizing an example method of manufacturing a drill jig.

FIG. 12 is a flowchart 1200 summarizing a method of manufacturing a drill jig. In a first step 1202, an edge alignment guide is provided. Then, in a second step 1204, a hole-spacing assembly, including a protrusion configured to engage a preexisting hole, is provided. Next, in a third step 1206, a second guide configured to facilitate movement of the hole-spacing assembly is provided. Then, in a fourth step 1208, the second guide is coupled to the hole-spacing assembly. Next, in a fifth step 1210, a biasing member is provided. Then, in a sixth step 1212, the biasing member is coupled to the hole-spacing assembly. Next, in a seventh step 1214, an actuator is provided. Finally, in an eighth step 1216, the actuator is coupled to the biasing member.

Figure 13:
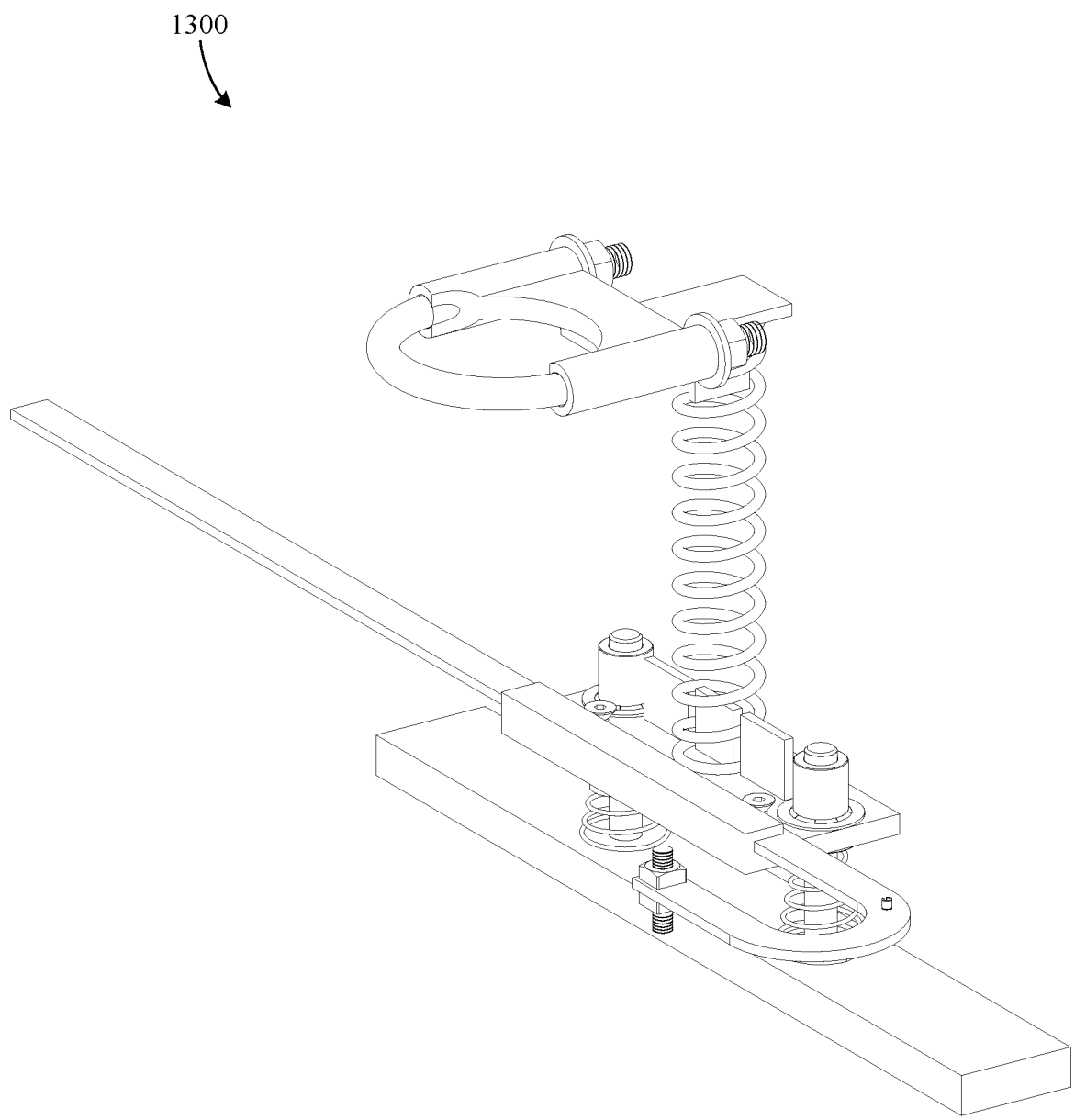
FIG. 13 is a perspective view of another example drill jig.

FIG. 13 shows a perspective view of another example drill jig. Drill jig 1300 is adapted to be used in conjunction with a drill press (not shown in FIG. 13). More specifically, jig 1300 mounts to the quill and table of a drill press to facilitate the drilling of evenly spaced holes along a straight line in a workpiece (e.g., wood, metal, plastic, etc.).

Figure 14:
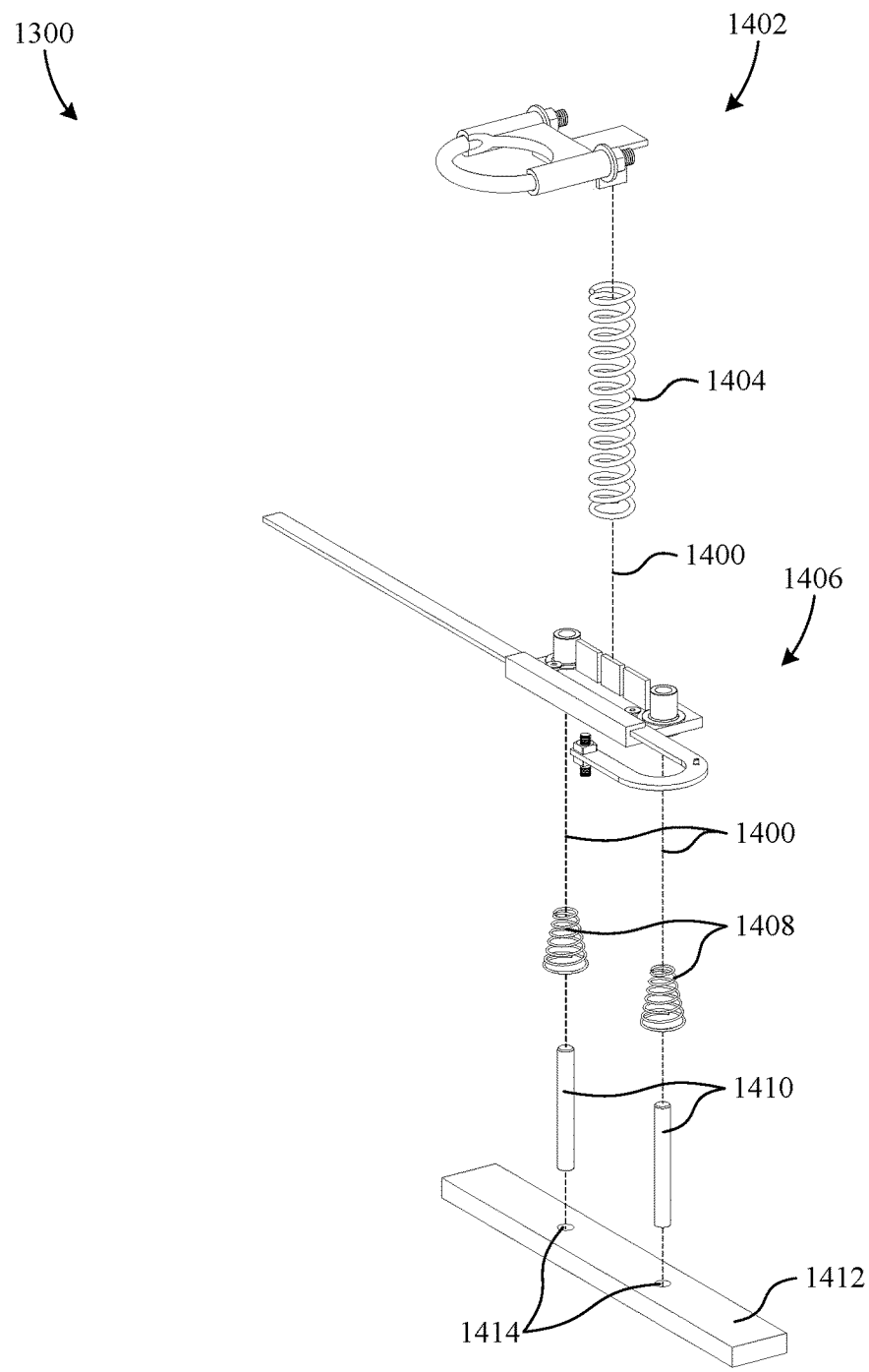
FIG. 14 is an exploded perspective view of the drill jig of FIG. 13.

FIG. 14 shows a perspective view of drill jig 1300 exploded along lines 1400. Jig 1300 includes an actuator assembly 1402, a first biasing member 1404, a hole-spacing assembly 1406, a set of biasing members 1408, a set of guides 1410, and a base 1412. Actuator assembly 1402 is configured to be fixably mounted around the quill of a drill press and also to seat the top portion of biasing member 1404. In response to advancing the chuck of the drill press toward a workpiece, actuator assembly 1402 urges downward against biasing member 1404. In this example device, biasing member 1404 is a relatively stiff spring having a bottom portion that is coupled to hole-spacing assembly 1406. Responsive to actuator assembly 1402 urging biasing member 1404 downward, hole-spacing assembly 1406 slides downward along guides 1410. Hole-spacing assembly 1406 is adapted to engage a hole previously drilled in a workpiece, such that the subsequent hole will be a precise, predetermined distance from the previously drilled hole. In this example device, each of biasing members 1408 is also a spring having a top portion and a bottom portion coupled to hole-spacing assembly 1406 and base 1412, respectively. In this example, guides 1410 are parallel slider rods that extend vertically from base 1412 to limit hole-spacing assembly 1406 to only vertical movement. Base 1412 is a rigid body that is adapted to be fixably mounted on a drill press table and provides an alignment edge for a workpiece. As shown, base 1412 includes two apertures 1414 into which respective guides 1410 are permanently press fit.

Figure 15:
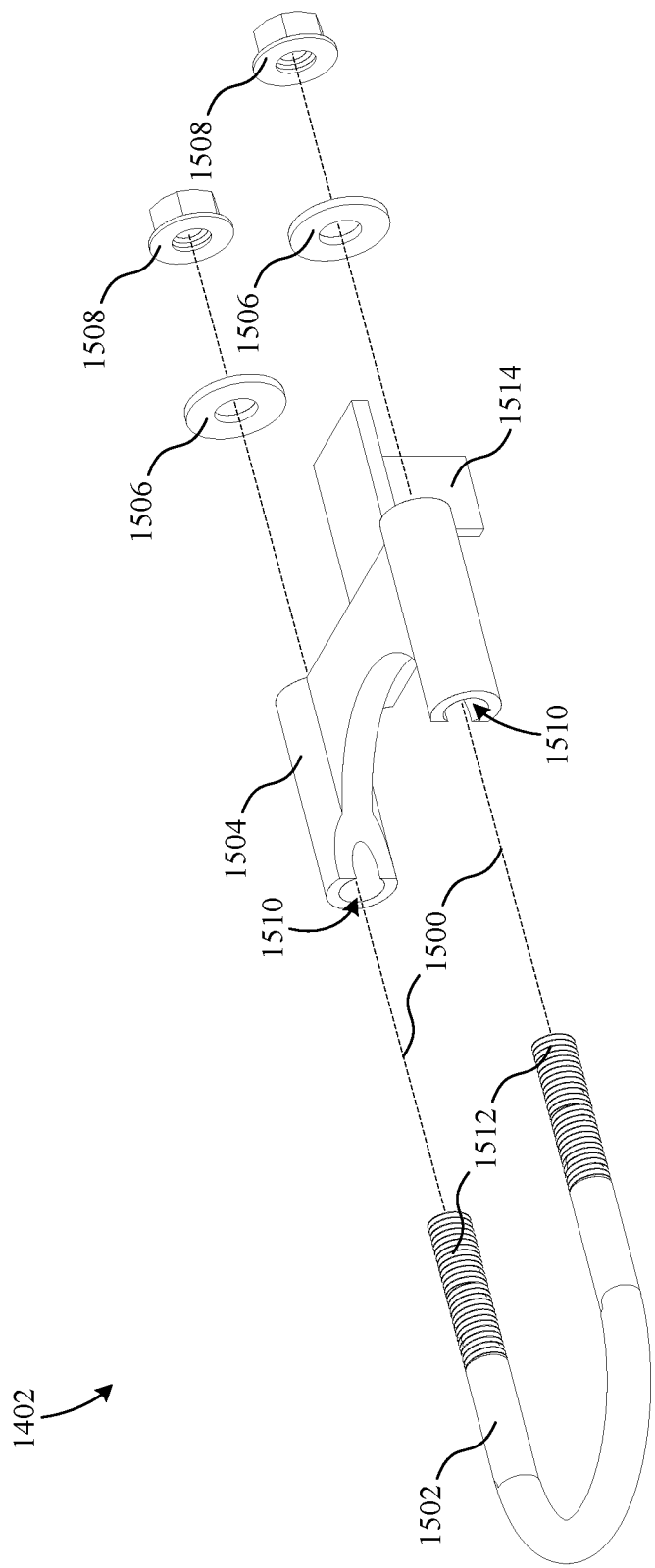
FIG. 15 is an exploded perspective view of the actuator of FIG. 13.

FIG. 15 is a perspective view of actuator assembly 1402 exploded along lines 1500. Actuator assembly 1402 is configured to be vertically fixed with respect to a drill chuck and to urge biasing member 1404 downward responsive to advancing the drill chuck downward. Actuator assembly 1402 includes a U-bolt 1502, a body 1504, a set of washers 1506, and a set of nuts 1508. In this example, U-bolt 1502 and body 1504 are, together, configured to be fixed around the quill of a drill press. Body 1504 includes a pair of apertures 1510 configured to receive respective threaded regions 1512 of U-bolt 1502. Once regions 1512 are disposed through apertures 1510, respective nuts 1508 are threaded on regions 1512 with respective washers 1506 disposed between body 1504 and nuts 1508. Body 1504 is constructed of, for example, steel and further includes a biasing member engaging feature 1514 configured to seat the top portion of biasing member 1404.

Figure 16:
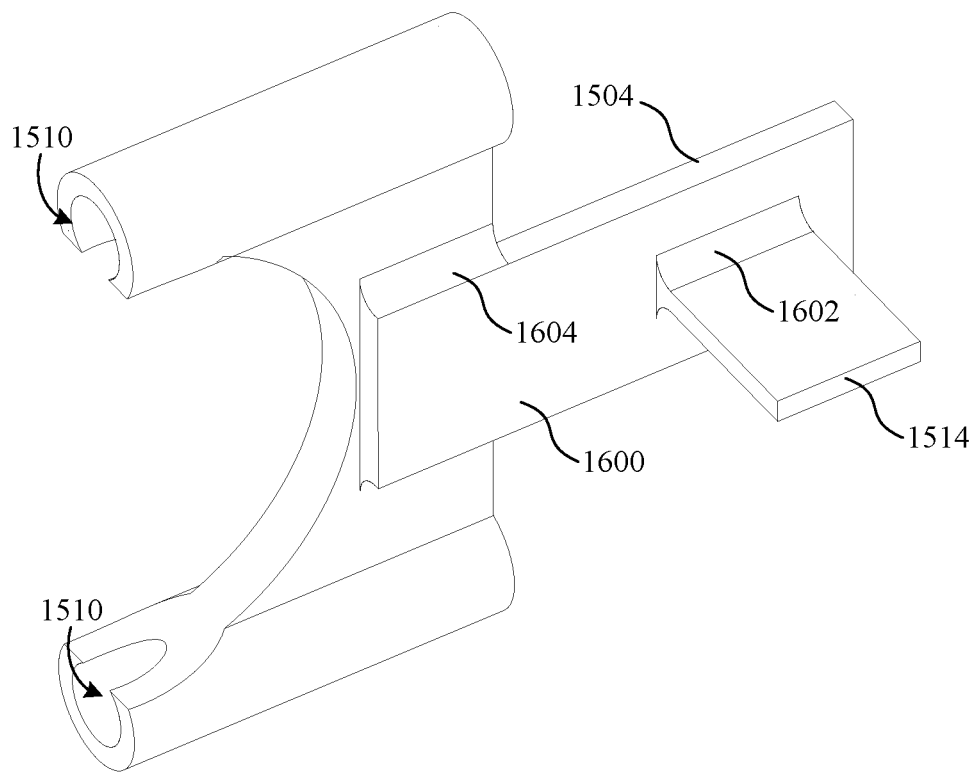
FIG. 16 is a rear perspective view of the body of the actuator of FIG. 13.

FIG. 16 is a rear perspective view of body 1504. As shown, feature 1514 is a rectangular plate that is perpendicularly attached to another rectangular plate 1600 via a weld 1602. Likewise, plate 1600 is also attached via a weld 1604.

Figure 17:
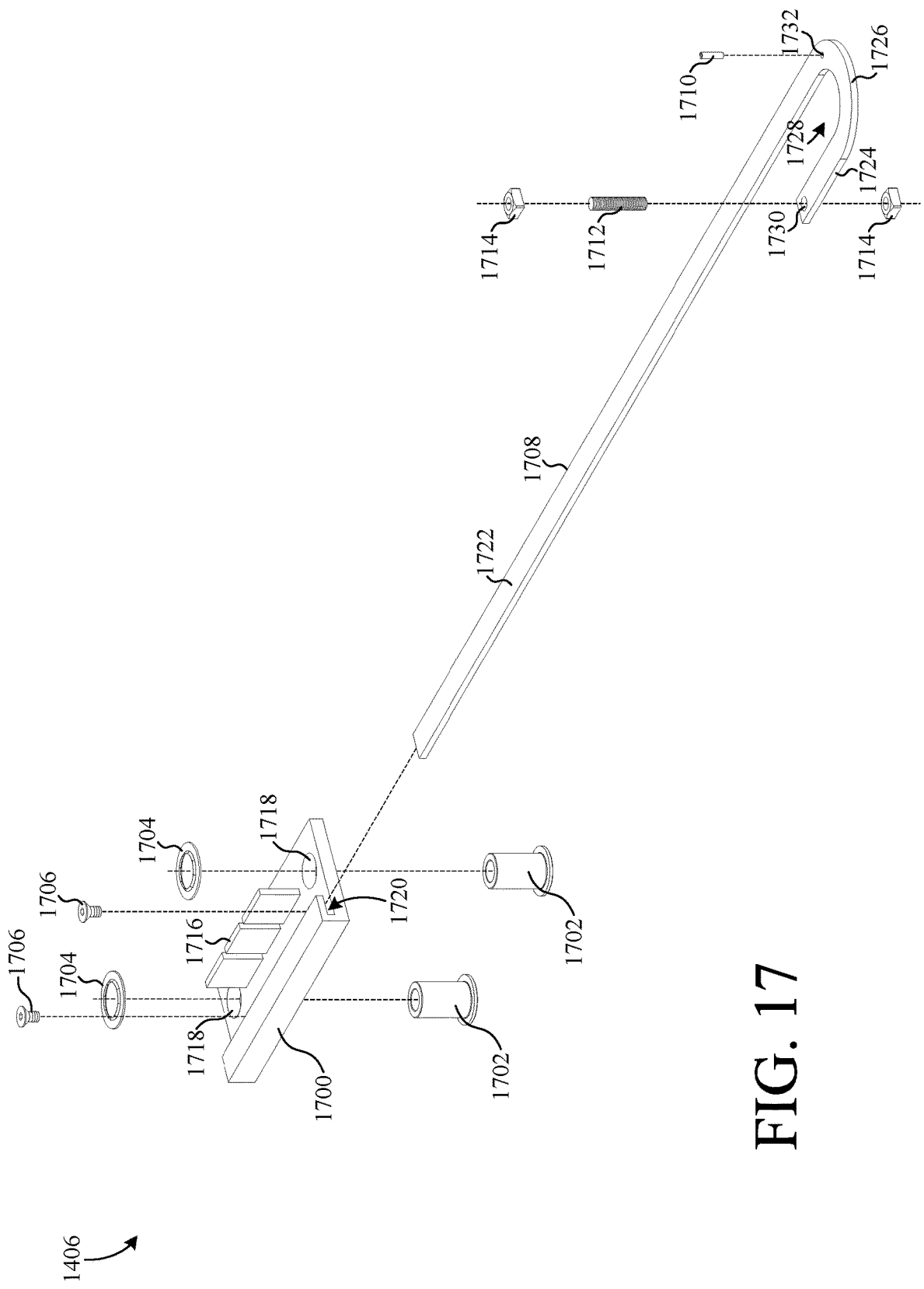
FIG. 17 is a perspective view of the hole-spacing assembly of the drill jig of FIG. 13.

FIG. 17 is an exploded perspective view of hole-spacing assembly 1406, which includes a body 1700, a set of bushings 1702, a set of retainer clips 1704, a set of hex screws 1706, an extendable arm 1708, a roll pin 1710, a protrusion 1712, and a set of square nuts 1714.

Body 1700 is a rigid body configured to slide down guides 1410 responsive to being urged upon by biasing member 1404 and slide upward when the force exerted thereon by biasing members 1408 exceeds that of biasing member 1404. Body 1700 includes a biasing member engaging feature 1716, a set of apertures 1718, a channel 1720, and a set of threaded apertures (not visible). Biasing member engaging feature 1716 is configured to seat the bottom portion of biasing member 1404. Apertures 1718 are configured to receive bushings 1702. Once bushings 1702 are disposed through apertures 1718, they are retained in place with respective retainer clips 1704. Channel 1720 is configured to slidably receive arm 1708. Once arm 1708 is at a desired position within channel 1720, arm 1708 is locked in place by tightening screws 1706 in the respective threaded apertures of body 1700.

Arm 1708 is curved metal structure configured to support and position protrusion 1712 with respect to body 1700. Arm 1708 includes a first portion 1722, a second portion 1724, and a third portion 1726. First portion 1722 is configured to slide within channel 1720 and second portion 1724 is configured to redirect protrusion 1712 toward body 1700. Third portion 1726 is an intermediate portion between first portion 1722 and second portion 1724. In the example embodiment, third portion 1726 is a 180 degree arc. However, third portion 1726 may alternatively be generally squared or any other shape that redirects second portion 1724 toward body 1700 without deviating from the present invention. The general redirection of third portion 1726 defines a crotch 1728 that provides an increased range in terms of the distance at which protrusion 1712 can be positioned with respect to body 1700. In this example, protrusion 1712 is a threaded shaft that is mounted in an aperture 1730 of second portion 1724 of arm 1708 via threaded square nuts 1714. Roll pin 1710 is compression fit into another aperture 1732 of arm 1708 to prevent arm 1708 from being disposed too far in channel 1720 by contacting the side of body 1700 when second portion 1724 is urged toward body 1700.

Figure 18:
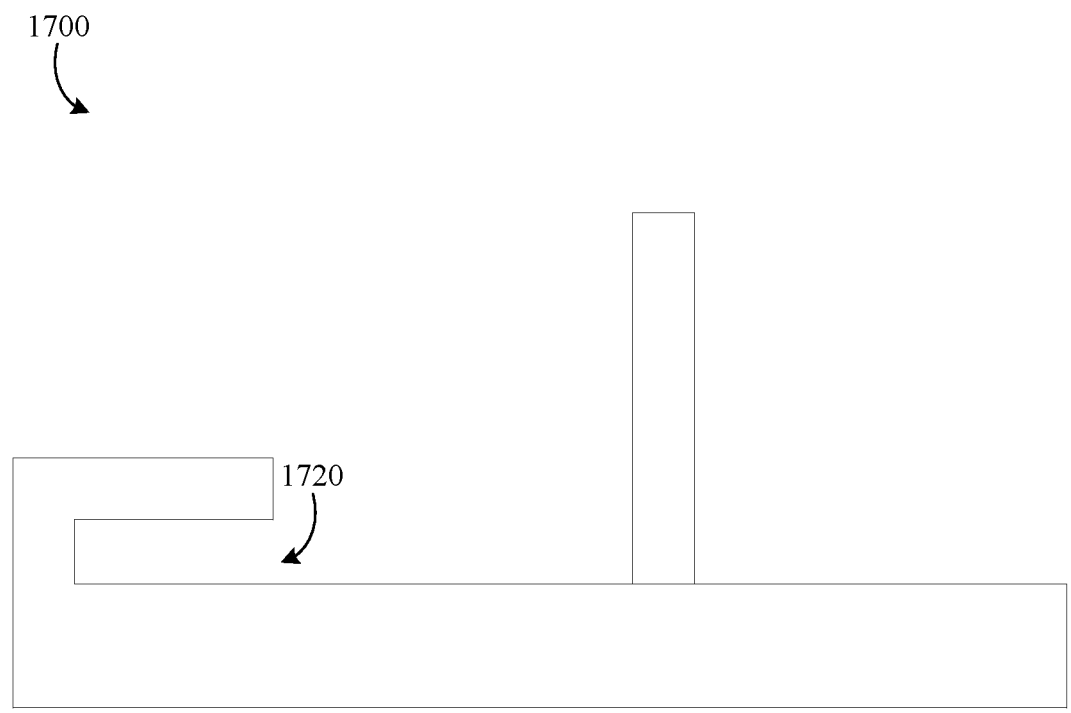
FIG. 18 is a side view of the body of the hole-spacing assembly of FIG. 17.

FIG. 18 shows a side view of body 1700. In the example embodiment, body 1700 is a unitary aluminum body formed by extrusion.

FIGS. 19A and 19B are top views of arm 1708 attached to body 1700 showing the range at which protrusion 1712 can be positioned with respect to body 1700.

FIG. 19A shows arm 1708 positioned with respect to body 1700 such that the distance ($D_{min}$) between a drill bit location 1900 and a previously drilled hole (under protrusion 1712) is the minimum for this particular device. Of course, $D_{min}$ can be even smaller by making second portion 1724 longer such that protrusion 1712 can extend closer to location 1900.

FIG. 19B shows arm 1708 positioned with respect to body 1700 such that the distance ($D_{max}$) between a drill bit location 1900 and a previously drilled hole is the maximum for this particular device. Of course, $D_{max}$ can be even greater by making first portion 1722 longer such that protrusion 1712 can extend further from location 1900. It should be recognized that, in this particular embodiment, the distance between location 1900 and protrusion 1712 can be any distance between $D_{min}$ and $D_{max}$ simply by loosening screws 1706, adjusting the position of arm 1708 with respect to body 1700, and then tightening screws 1706 until arm 1708 is locked in position.

Figure 20:
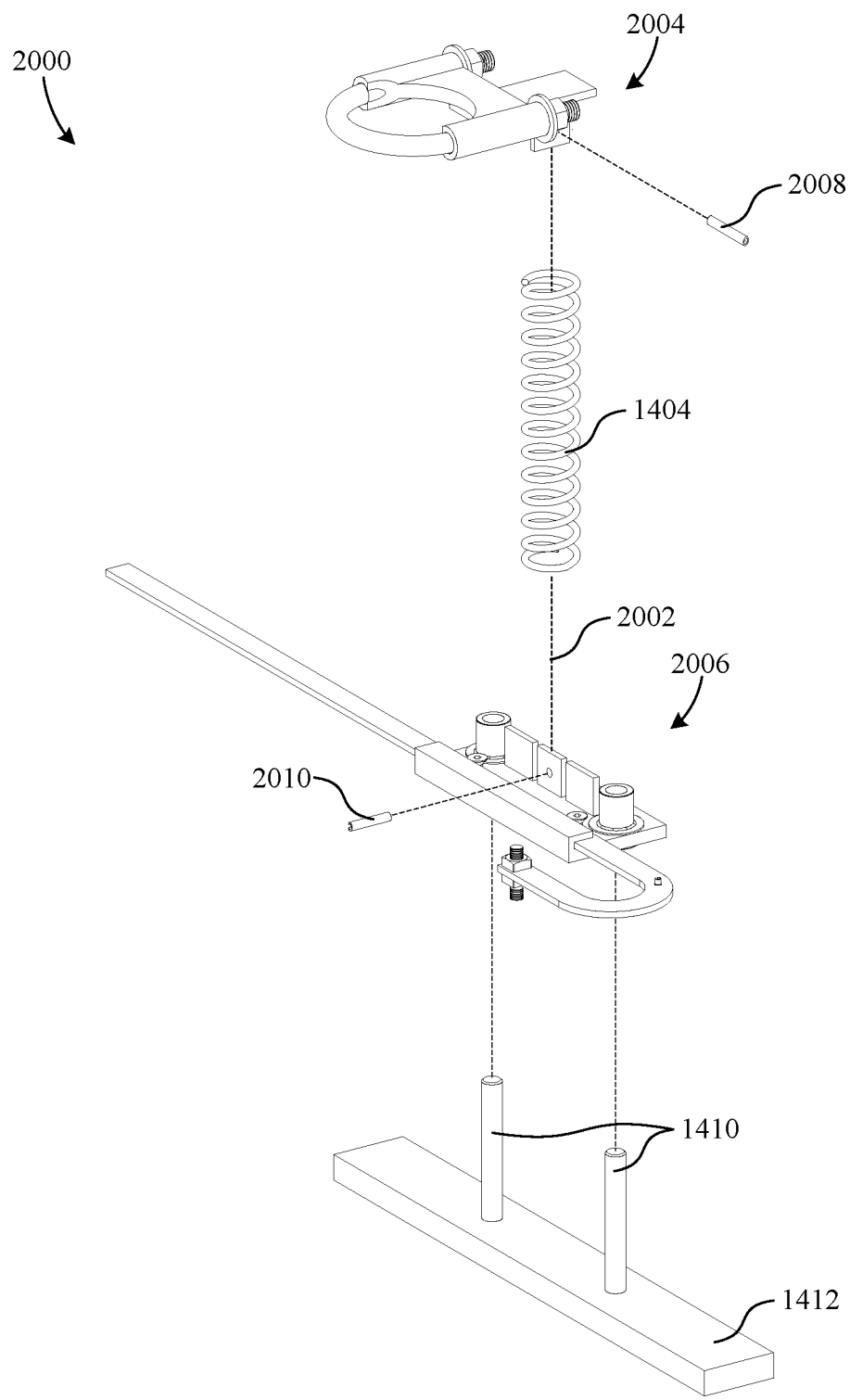
FIG. 20 is a perspective view of another example drill jig.

FIG. 20 shows a perspective view of a drill jig 2000 exploded along a line 2002 according to another embodiment of the present invention. Jig 2000 is substantially identical to jig 1300, the only difference being that jig 2000 has a modified actuator 2004 and hole-spacing assembly 2006 which, together, make biasing members 1408 obsolete. The features of jig 2000, actuator 2004, and assembly 2006 that are identical to those of jig 1300 are, therefore, denoted by like reference numbers and withheld from the following description.

In jig 2000, biasing members 1408 are not required to urge assembly 2006 back upward after actuation. Rather, jig 2000 includes a first biasing member engaging feature 2008 and a second biasing member engaging feature 2010. Feature 2008 is configured to fix the top of biasing member 1404 to actuator 2004 and feature 2010 is configured to fix the bottom of biasing member 1404 to assembly 2006. As actuator 2004 is returned to a non-actuated position, the tension imparted on biasing member 1404 by feature 2008 lifts feature 2010 and, therefore, assembly 2006 back into a non-actuated position.

Figure 21:
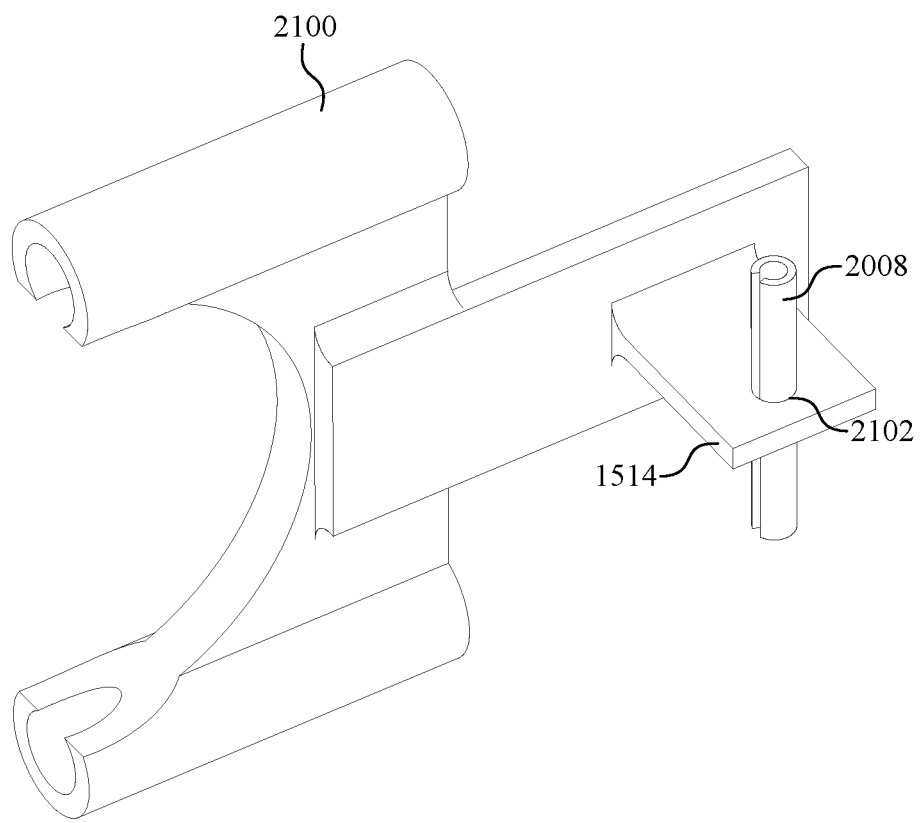
FIG. 21 is a rear perspective view of the body of the actuator of FIG. 20.

FIG. 21 is a rear perspective view of a body 2100 of actuator 2004 and feature 2008 assembled. Body 2100 is substantially identical to body 1504, the only difference being that body 2100 further includes an aperture 2102 that receives feature 2008. In this example, feature 2008 is a roll pin that is compression fit into aperture 2102. The length of feature 2008 is greater than the outer diameter of biasing member 1404 such that feature 2008 engages biasing member 1404 when biasing member 1404 is seated on feature 1514.

Figure 22:
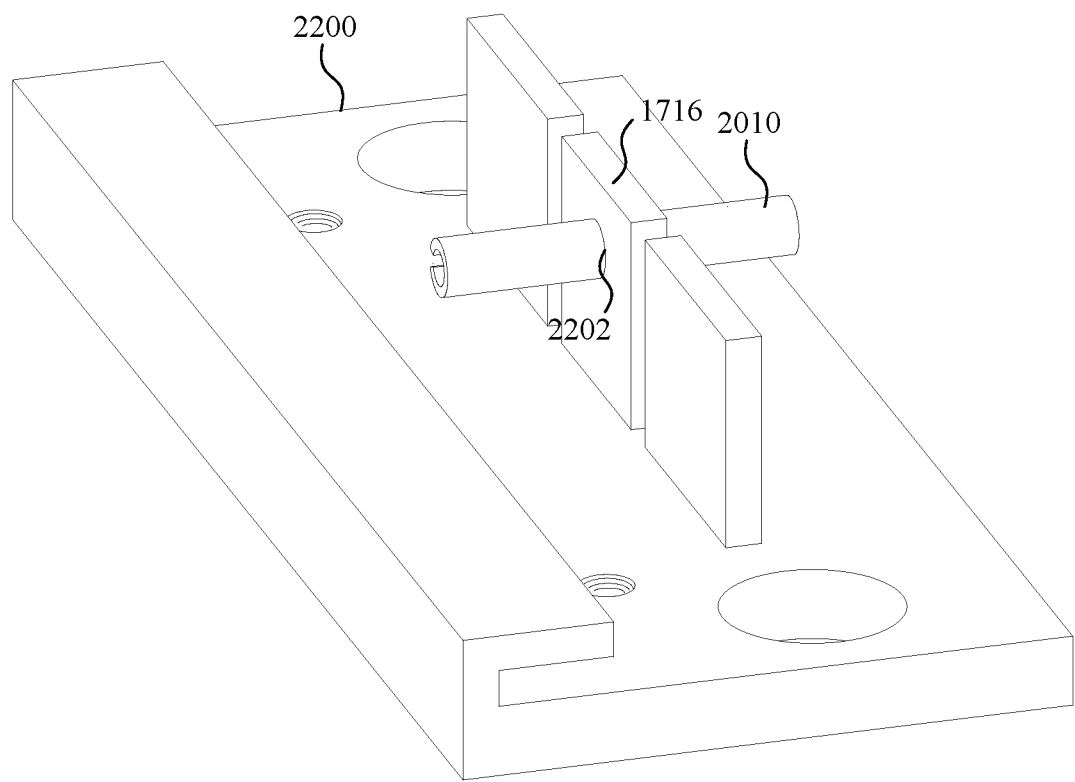
FIG. 22 is a rear perspective view of the body of the hole-spacing assembly of FIG. 20.

FIG. 22 is a rear perspective view of a body 2200 of assembly 2006 and feature 2010 assembled. Body 2200 is substantially identical to body 1700, the only difference being that body 2200 further includes an aperture 2202 that receives feature 2010. In this example, feature 2010 is a roll pin that is compression fit into aperture 2202. The length of feature 2010 is also greater than the outer diameter of biasing member 1404 such that feature 2010 engages biasing member 1404 when biasing member 1404 is seated on feature 1716. Those skilled in the art will recognize that other biasing member engaging features (e.g., permanent barbs, removable cotter pins, etc.) may be substituted for features 2008 and 2010 without departing from the main scope of the present invention.

Figure 23:
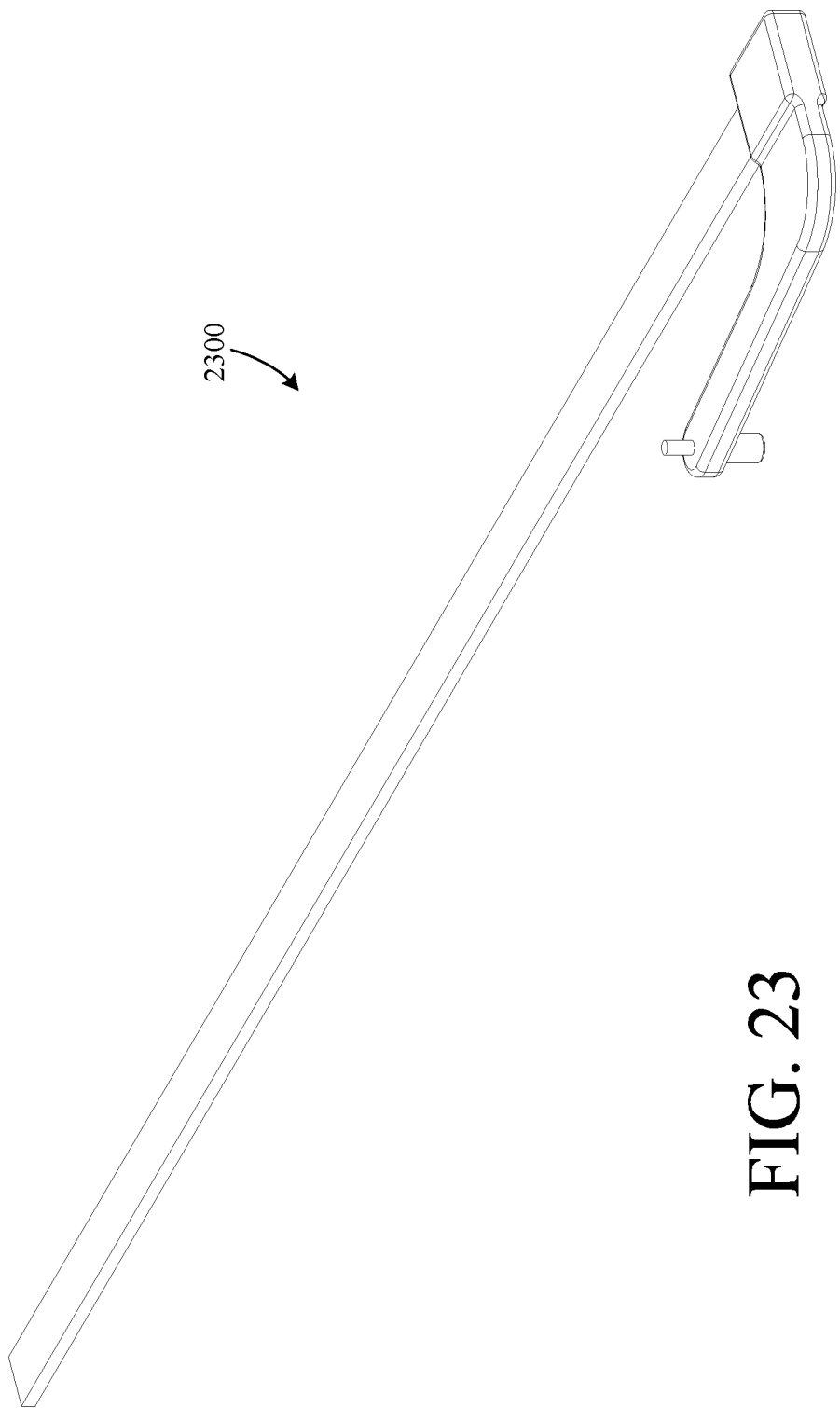
FIG. 23 is a perspective view of another example hole-spacing assembly.

FIG. 23 is a perspective view of an alternate extendable arm assembly 2300 that may be substituted for arm 1708 without further modification to jig 1300. Assembly 2300 provides additional advantages. For example, assembly 2300 can be disassembled and, therefore, packaged at a reduced volume. As another example, assembly 2300 can be mass manufactured more efficiently. It should be recognized that assembly 2300 slidably engages body 1700 in the same way that arm 1708 does. In other words, body 1700 and screws 1706 require no modification to receive assembly 2300.

Figure 24:
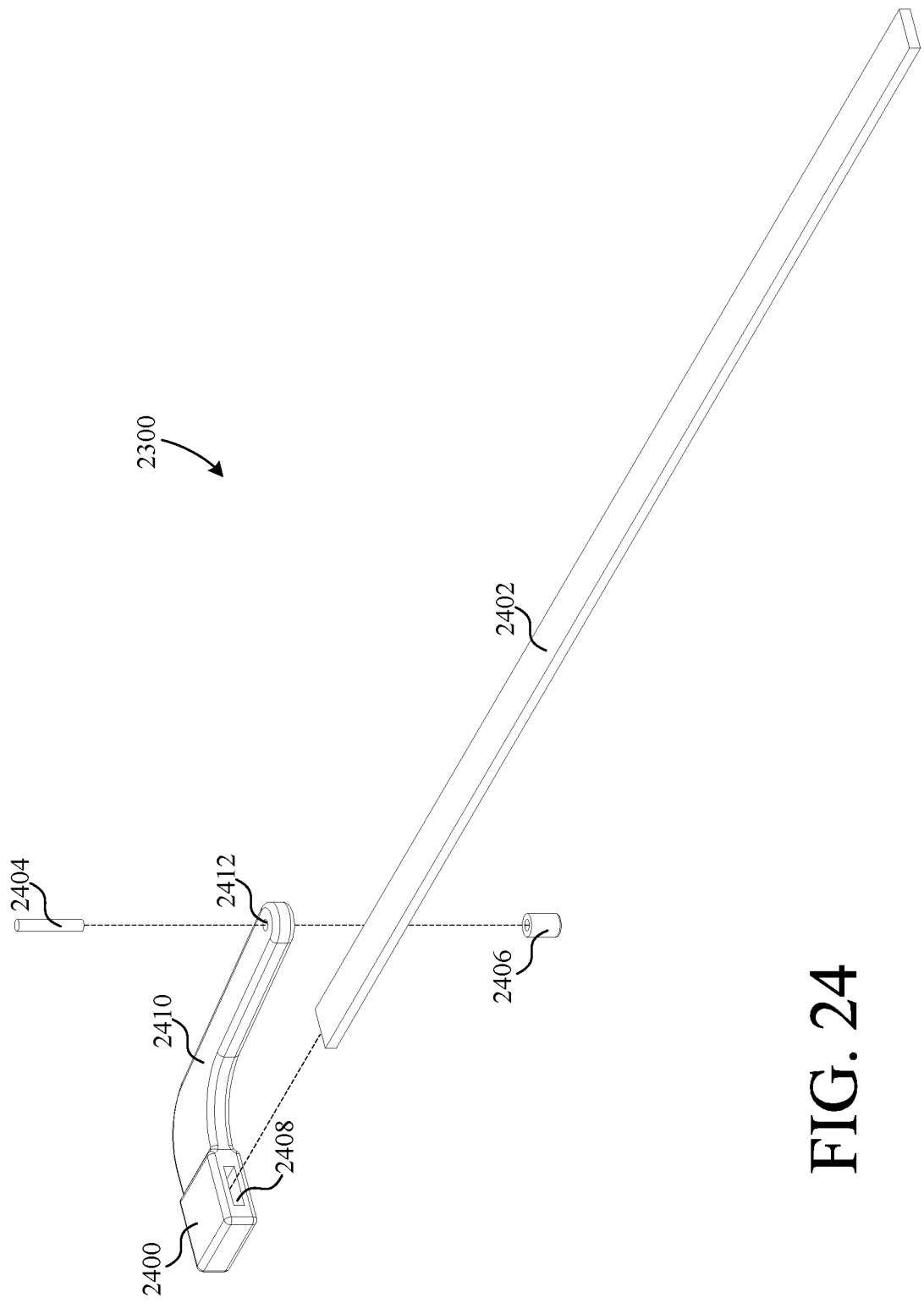
FIG. 24 is a rear perspective view of the hole-spacing assembly of FIG. 23.

FIG. 24 is an exploded rear perspective view of extendable arm assembly 2300, which includes a body 2400, a guide 2402, a pin 2404, and a plurality of adapter caps 2406 (only one shown). Body 2400 is a rigid monolithic structure formed, for example, by injection molding Acrylonitrile Butadiene Styrene (ABS) plastic. Body 2400 defines a recess 2408 and an arm 2410. Recess 2408 is configured to receive guide 2402, which is a straight metal bar removably press fit therein during user assembly. Indeed, guide 2402 is configured to slide in channel 1720 of body 1700. Arm 2410 is configured to position pin 2404 and, therefore, cap 2406 with respect to guide 2402. Arm 2410 defines an aperture 2412 through which pin 2404 is press fit. Pin 2404 is a solid cylindrical metal pin but may alternately be a roll pin or the like without departing from the main scope of the invention. Cap 2406 is configured to be press fit onto the bottom portion of pin 2404 so that it can engage previously drilled holes in a work piece. Cap 2406 is one of many interchangeable caps that are adapted to fit into different drill-hole sizes. Indeed, all of caps 2406 have the same size cylindrical recess that receives pin 2404 but different exterior diameters to accommodate for different drill-hole sizes. In this example, caps 2406 are formed from molded ABS plastic but may be formed by any suitable manufacturing process and/or material.

The description of particular embodiments of the present invention is now complete. Many of the described features may be substituted, altered or omitted without departing from the scope of the invention. For example, alternate fasteners (e.g., screws, compression pins, etc.) may be substituted for the bolts used to fasten the plates of the hole-spacing assembly. As another example, alternate devices and/or features (e.g., pins, integrally molded protrusion, nylon screws, etc.) may be substituted for the protrusion. In addition, various types of drill stops, in the press mechanisms or on the drill bits themselves, can be used in combination with the described embodiments to limit the depth of holes drilled in workpieces These and other deviations from the particular embodiments shown will be apparent to those skilled in the art, particularly in view of the foregoing disclosure.

I claim:

1. A drill jig comprising:
an edge alignment guide configured to abut an edge of a workpiece to facilitate movement of said workpiece along a first straight line;
a hole-spacing assembly including a body and an arm, said arm being adjustably coupled to said body such that a fixed position of said arm with respect to said body is adjustable;
a protrusion coupled to said arm to engage a preexisting hole in a workpiece positioned by said edge alignment guide;
a second guide coupled to said hole-spacing assembly and configured to facilitate movement of said hole-spacing assembly along a second straight line perpendicular to said first straight line, whereby said protrusion can move into and out of said preexisting hole;
a first biasing member coupled to said hole-spacing assembly and operative to exert a force on said hole-spacing assembly in a direction parallel to said second straight line; and
an actuator responsive to a force applied by a component of a drill and operative to move said hole-spacing assembly along said second straight line via said first biasing member.

2. The drill jig of claim 1, wherein:
said arm includes a first portion extendable from said body in a direction parallel to said first straight line;
said arm includes a second portion offset with respect to said first portion;
said protrusion is coupled to said second portion;
said arm defines an intermediate crotch disposed between said first portion and said second portion; and
said crotch is configured to receive at least a portion of said body.

3. The drill jig of claim 2, wherein
said body defines a channel extending in said direction parallel to said first straight line, and
said first portion of said arm is slidably disposed in said channel.

4. The drill jig of claim 3, further comprising a locking device coupled to said body, said locking device being switchable between a first position wherein said arm is free to slide with respect to said body and a second position wherein said arm is fixed with respect to said body.

5. The drill jig of claim 1, further comprising a base configured to be mounted on a drill press table, said second guide being coupled to said base.

6. The drill jig of claim 5, further comprising a second biasing member disposed between said hole-spacing assembly and said base, said first biasing member having a higher stiffness than said second biasing member.

7. The drill jig of claim 6, further comprising a third biasing member disposed between said hole-spacing assembly and said base, said first biasing member having a higher stiffness than said second biasing member and said third biasing member combined.

8. The drill jig of claim 5, wherein
said second guide includes a set of parallel rods fixed to said base, and
said hole-spacing assembly is slidably coupled to said set of parallel rods.

9. The drill jig of claim 1, wherein the position of said protrusion with respect to said body of said hole-spacing assembly is adjustable.

10. The drill jig of claim 1, wherein:
said hole-spacing assembly includes a first biasing member engaging feature and said actuator includes a second biasing member engaging feature;
said first biasing member engaging feature is coupled to a first end of said biasing member;
said second biasing member engaging feature is coupled to a second end of said biasing member;
said first biasing member engaging feature remains coupled to said first end of said biasing member when said biasing member is under tension; and
said second biasing member engaging feature remains coupled to said second end of said biasing member when said biasing member is under tension.

11. The drill jig of claim 10, wherein
said first biasing member engaging feature is permanently coupled to said first end of said biasing member, and
said second biasing member engaging feature is permanently coupled to said second end of said biasing member.

12. The drill jig of claim 10, wherein
said first biasing member engaging feature is temporarily coupled to said first end of said biasing member, and
said second biasing member engaging feature is temporarily coupled to said second end of said biasing member.

13. A drill jig comprising:
an edge alignment guide configured to abut an edge of a workpiece to facilitate movement of said workpiece along a first straight line;
a hole-spacing assembly including a protrusion and a first biasing member engaging feature, said protrusion disposed to engage a preexisting hole in a workpiece positioned by said edge alignment guide;
a second guide coupled to said hole-spacing assembly and configured to facilitate movement of said hole-spacing assembly along a second straight line perpendicular to said first straight line, whereby said protrusion can move into and out of said preexisting hole;
a first biasing member coupled to said hole-spacing assembly and operative to exert a force on said hole-spacing assembly in a direction parallel to said second straight line; and
an actuator including a second biasing member engaging feature, said actuator being responsive to a force applied by a component of a drill and operative to move said hole-spacing assembly along said second straight line via said first biasing member; and wherein
said first biasing member engaging feature and said second biasing member engaging feature remain coupled to said biasing member when said biasing member is under tension.

14. The drill jig of claim 13, wherein
said first biasing member engaging feature is permanently coupled to a first end of said biasing member, and
said second biasing member engaging feature is permanently coupled to a second end of said biasing member.

15. The drill jig of claim 13, wherein
said first biasing member engaging feature is temporarily coupled to a first end of said biasing member, and
said second biasing member engaging feature is temporarily coupled to a second end of said biasing member.

16. The drill jig of claim 13, wherein:
said a hole-spacing assembly includes a body and an arm;
said arm is adjustably coupled to said body such that the fixed position of said arm with respect to said body is adjustable;
said arm includes a first portion extendable from said body in a direction parallel to said first straight line;
said arm includes a second portion offset with respect to said first portion;
said protrusion is coupled to said second portion;
said arm defines an intermediate crotch disposed between said first portion and said second portion; and
said crotch is configured to receive at least a portion of said body to extend the range of said protrusion.

17. The drill jig of claim 16, wherein
said body defines a channel extending in said direction parallel to said first straight line, and
said first portion of said arm is slidably disposed in said channel.

18. The drill jig of claim 17, further comprising a locking device coupled to said body, said locking device being switchable between a first position wherein said arm is free to slide with respect to said body and a second position wherein said arm is fixed with respect to said body.

19. The drill jig of claim 13, further comprising a base configured to be mounted on a drill press table, said second guide being coupled to said base.

20. The drill jig of claim 19, wherein
said second guide includes a set of parallel rods fixed to said base, and
said hole-spacing assembly is slidably coupled to said set of parallel rods.

* * * * *